(12) United States Patent
Remiszewski et al.

(10) Patent No.: US 9,798,918 B2
(45) Date of Patent: Oct. 24, 2017

(54) METHOD AND SYSTEM FOR ANALYZING BIOLOGICAL SPECIMENS BY SPECTRAL IMAGING

(71) Applicant: CIRECA THERANOSTICS, LLC, Parsippany, NJ (US)

(72) Inventors: Stanley H. Remiszewski, Spencer, MA (US); Clay M. Thompson, Camano Island, WA (US); Max Diem, Jamestown, RI (US); Aysegul Egin, Arlington, MA (US)

(73) Assignee: CIRECA THERANOSTICS, LLC, Parsippany, NJ (US)

( * ) Notice: Subject to any disclaimer, the term of this patent is extended or adjusted under 35 U.S.C. 154(b) by 619 days.

(21) Appl. No.: 14/219,984

(22) Filed: Mar. 19, 2014

(65) Prior Publication Data

US 2014/0286561 A1 Sep. 25, 2014

Related U.S. Application Data

(63) Continuation-in-part of application No. 13/645,970, filed on Oct. 5, 2012.
(Continued)

(51) Int. Cl.
G06K 9/00 (2006.01)
G06K 9/68 (2006.01)
G06K 9/62 (2006.01)

(52) U.S. Cl.
CPC ....... *G06K 9/00127* (2013.01); *G06K 9/6262* (2013.01); *G06K 9/685* (2013.01); *G06K 9/6219* (2013.01)

(58) Field of Classification Search
None
See application file for complete search history.

(56) References Cited

U.S. PATENT DOCUMENTS

| 7,496,220 B2 * | 2/2009 | Izzia ........................ G01J 3/02 382/128 |
| 8,208,698 B2 * | 6/2012 | Bogdan ................. G06T 7/0012 382/128 |

(Continued)

FOREIGN PATENT DOCUMENTS

| WO | WO 2011/163624 A1 | 12/2011 |
| WO | WO 2012/030840 A2 | 3/2012 |
| WO | WO 2013/028926 A2 | 2/2013 |

OTHER PUBLICATIONS

International Search Report, dated Sep. 12, 2014, corresponding to International Patent Application No. PCT/US2014/031254.
(Continued)

*Primary Examiner* — Avinash Yentrapati
(74) *Attorney, Agent, or Firm* — Arent Fox LLP

(57) ABSTRACT

The methods, devices, and systems may allow a practitioner to obtain information regarding a biological sample, including analytical data, a medical diagnosis, and/or a prognosis or predictive analysis. The method, devices, and systems may provide a grade or level of development for identified diseases. In addition, the methods, devices and systems may generate a confidence value for the predictive classifications generated, which may, for example be generated in a format to show such confidence value or other feature in a graphical representation (e.g., a color code). Further, the methods, devices and system may aid in the identification and discovery of new classes and tissue sub-types.

31 Claims, 21 Drawing Sheets

Related U.S. Application Data

(60) Provisional application No. 61/803,376, filed on Mar. 19, 2013.

(56) References Cited

U.S. PATENT DOCUMENTS

| | | | | |
|---|---|---|---|---|
| 8,295,565 B2* | 10/2012 | Gu | ............................ | G06T 5/007 382/128 |
| 8,634,607 B2* | 1/2014 | Levenson | ............ | A61B 5/0059 382/128 |
| 8,842,883 B2* | 9/2014 | Chen | .................... | G06K 9/6267 382/103 |
| 8,948,500 B2* | 2/2015 | Chen | .................... | G06K 9/6219 382/155 |
| 9,008,391 B1* | 4/2015 | Solanki | ................. | G06T 7/0014 382/128 |
| 2002/0046198 A1* | 4/2002 | Hitt | ...................... | G06K 9/6217 706/20 |
| 2002/0118883 A1* | 8/2002 | Bhatt | ...................... | G06T 5/002 382/224 |
| 2004/0010375 A1* | 1/2004 | Schomacker | ........ | A61B 5/0059 702/19 |
| 2004/0068167 A1* | 4/2004 | Hsieh | .................... | G06T 7/0012 600/407 |
| 2004/0207625 A1* | 10/2004 | Griffin | ................. | A61B 5/0059 345/440 |
| 2006/0001545 A1* | 1/2006 | Wolf | ...................... | A47K 3/001 340/573.1 |
| 2006/0064248 A1* | 3/2006 | Saidi | .................... | G06K 9/0014 702/19 |
| 2006/0257031 A1* | 11/2006 | Abramoff | ............ | G06K 9/6277 382/224 |
| 2008/0234984 A1* | 9/2008 | Ortyn | ................. | G01N 21/6458 702/190 |
| 2009/0298703 A1* | 12/2009 | Gough | ................. | G06T 7/0012 506/8 |
| 2009/0318815 A1* | 12/2009 | Barnes | ................. | A61B 5/0062 600/473 |
| 2009/0324051 A1* | 12/2009 | Hoyt | ........................ | G01N 1/30 382/133 |
| 2010/0111396 A1* | 5/2010 | Boucheron | .......... | G06K 9/0014 382/133 |
| 2010/0119128 A1* | 5/2010 | Zhang | .................. | G06K 9/6229 382/128 |
| 2010/0310183 A1* | 12/2010 | Kendall | ................. | A61B 6/502 382/224 |
| 2011/0040169 A1* | 2/2011 | Kamen | .................. | A61B 6/037 600/411 |
| 2011/0206262 A1* | 8/2011 | Sammak | ............ | G06K 9/00127 382/133 |
| 2011/0248166 A1* | 10/2011 | Diem | ................ | H01L 27/14649 250/330 |
| 2011/0274338 A1* | 11/2011 | Park | ..................... | G06K 9/6284 382/133 |
| 2012/0082362 A1* | 4/2012 | Diem | ................... | A61B 5/0071 382/133 |
| 2012/0115139 A1 | 5/2012 | Kuroda et al. | | |
| 2012/0147010 A1* | 6/2012 | Schmidt | ................ | G06F 19/321 345/440 |
| 2012/0237106 A1* | 9/2012 | Athelogou | ........... | G06K 9/0014 382/133 |
| 2012/0328178 A1* | 12/2012 | Remiszewski | ....... | A61B 5/0071 382/133 |
| 2013/0089248 A1* | 4/2013 | Remiszewski | ..... | G06K 9/00127 382/128 |
| 2013/0208950 A1* | 8/2013 | Athelogou | ............ | G06T 7/0012 382/107 |
| 2013/0338496 A1* | 12/2013 | Hielscher | ............. | A61B 5/0064 600/425 |
| 2015/0268226 A1* | 9/2015 | Bhargava | ........... | G01N 33/5091 514/789 |
| 2016/0157725 A1* | 6/2016 | Munoz | ................. | A61B 5/0077 600/430 |

OTHER PUBLICATIONS

Extended European Search Report of related European Patent Application No. 14768134.0 dated Nov. 10, 2016.

\* cited by examiner

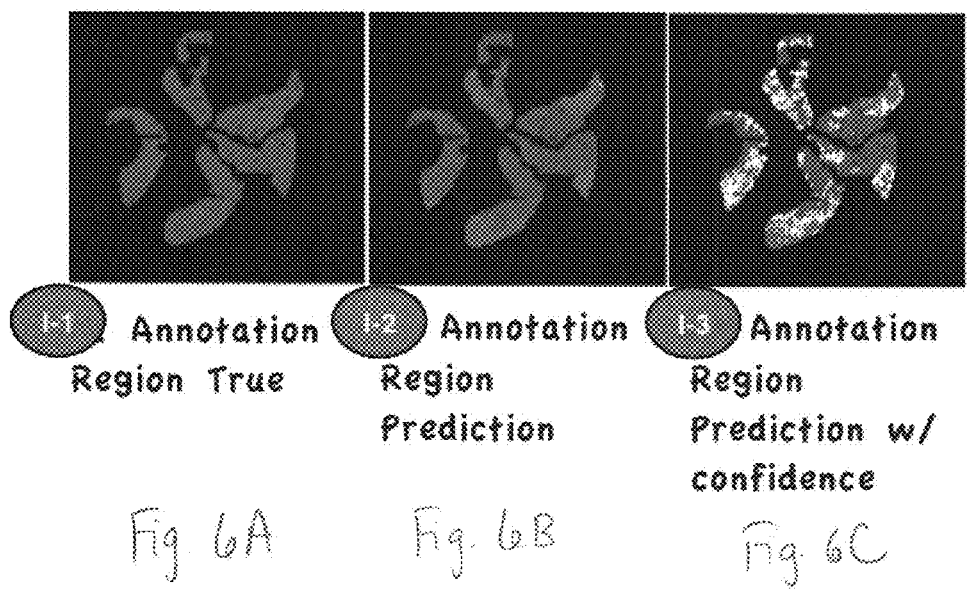

I5 Whole Sample Prediction w/ confidence

Whole Sample Prediction w/ confidence

Whole Sample Prediction overlay on clinical image

I4 Whole Sample Prediction w/ confidence

Whole sample true, SqCC

Whole sample prediction, SqCC+

Whole sample New classes after TP/TN, FP/FN difference analysis

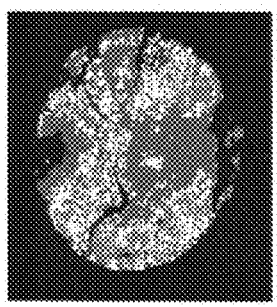 Whole sample prediction, five classes w/confidence
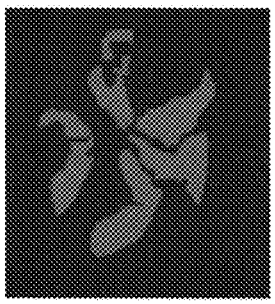 Annotation Region True
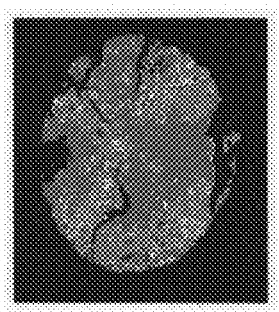 Whole sample prediction, five classes
Fig. 10
Fig. 11
Fig. 12

I8 Prediction legend w/ confidence scale

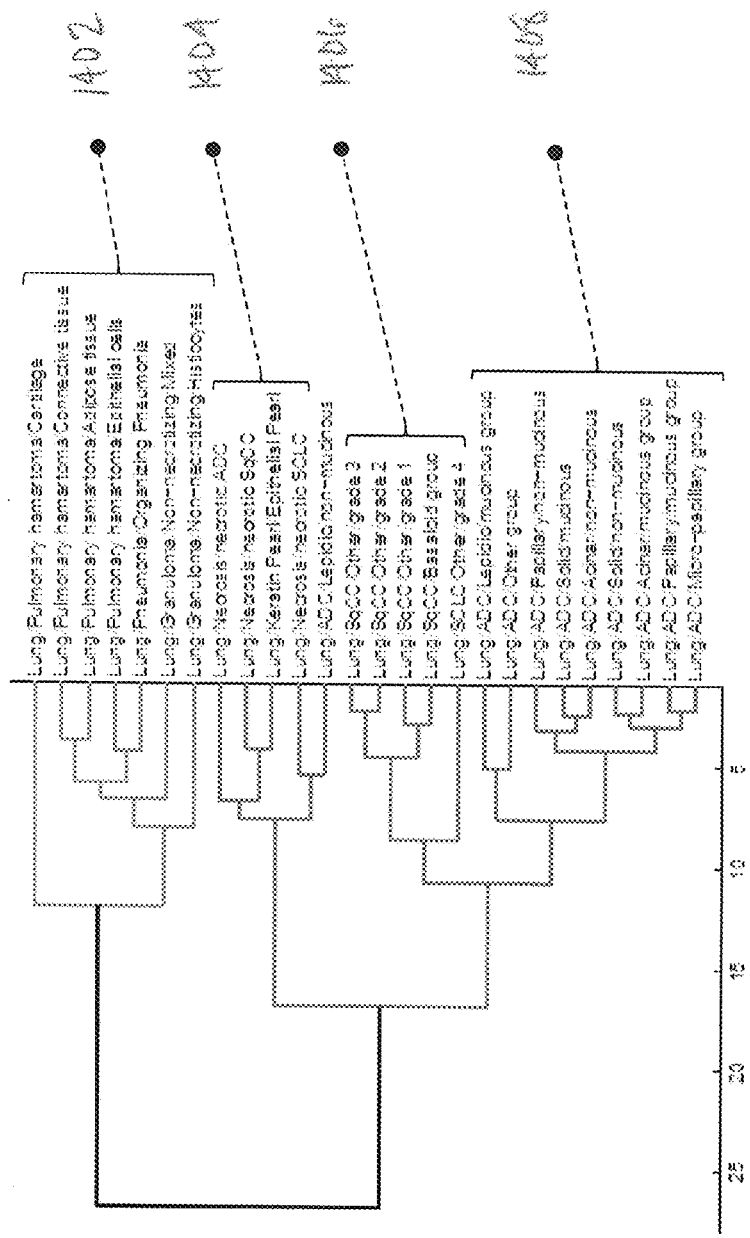

Algorithm Structures
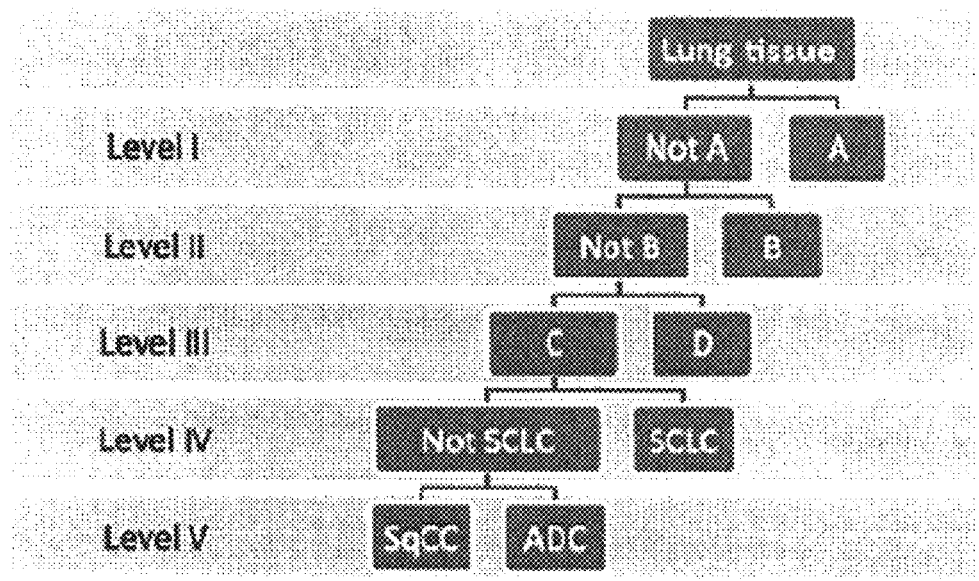
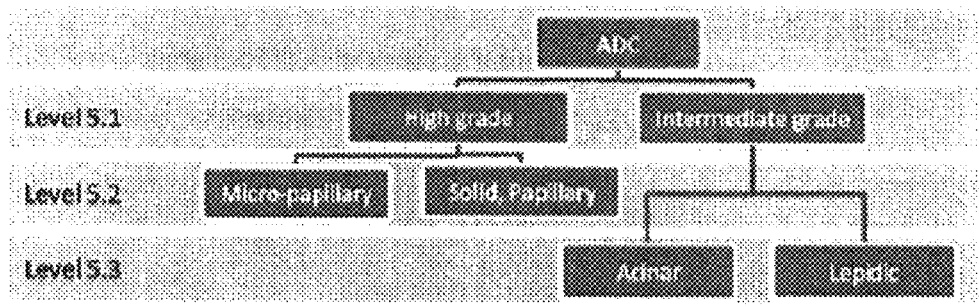
Fig. 14C

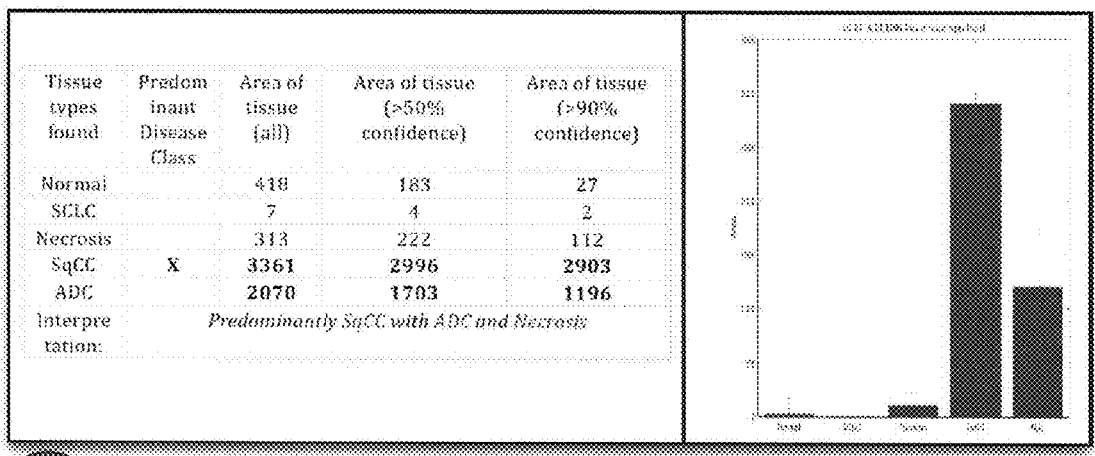
 Sample classification report
Fig. 15

Confusion Matrix

| True\Predicted | SqCC  | ADC   | WHITE |
|----------------|-------|-------|-------|
| SqCC           | 25930 | 3719  | 0     |
| ADC            | 2879  | 26763 | 0     |
| WHITE          | 0     | 0     | 9412  |

Performance Metrics by class

|                          | SqCC    | ADC     | WHITE  |
|--------------------------|---------|---------|--------|
| true_positives           | 25930   | 26763   | 9412   |
| false_positives          | 2879    | 3719    | 0      |
| true_negatives           | 36175   | 35342   | 59291  |
| false_negatives          | 3719    | 2879    | 0      |
| total_positives          | 29649   | 29642   | 9412   |
| total_negatives          | 39054   | 39061   | 59291  |
| sensitivity              | 0.8746  | 0.9029  | 1      |
| specificity              | 0.9263  | 0.9048  | 1      |
| accuracy                 | 0.904   | 0.904   | 1      |
| bal_accuracy             | 0.9004  | 0.9038  | 1      |
| log_loss                 | 1.3268  | 1.3268  | 0      |
| pos_predictive_value     | 0.9001  | 0.878   | 1      |
| neg_predictive_value     | 0.9068  | 0.9247  | 1      |
| confidence_interval_low_95  | 0.9018 | 0.9018 | 1   |
| confidence_interval_high_95 | 0.9062 | 0.9062 | 1   |
| likelihood_ratio_positive | 11.8636 | 9.483Inf |       |
| likelihood_ratio_negative | 0.1354 | 0.1073 | 0     |
| AUROC                    | 0.0845  | 0.6746  | 1      |
| AUPRC                    | 0.8614  | 0.8512  | 0.9994 |

 Validation Report

Fig. 16

METHOD AND SYSTEM FOR ANALYZING BIOLOGICAL SPECIMENS BY SPECTRAL IMAGING

RELATED APPLICATIONS

This application claims priority to U.S. Provisional Patent Application No. 61/803,376 titled "Infrared and Raman Micro-Spectral Imaging of Human Cells and Tissue for Medical Diagnostics" filed Mar. 19, 2013 and is a continuation in part of U.S. patent application Ser. No. 13/645,970 titled "METHOD AND SYSTEM FOR ANALYZING BIOLOGICAL SPECIMENS BY SPECTRAL IMAGING" filed Oct. 5, 2012. This application contains subject matter related to U.S. patent application Ser. No. 13/507,386 titled "METHOD FOR ANALYZING BIOLOGICAL SPECIMENS BY SPECTRAL IMAGING" filed Jun. 25, 2012, U.S. Provisional Patent Application No. 61/322,642 titled "A TUNABLE LASER-BASED INFRARED IMAGING SYSTEM" filed Apr. 9, 2010; U.S. patent application Ser. No. 12/994,647 filed titled "METHOD OF RECONSTITUTING CELLULAR SPECTRA USEFUL FOR DETECTING CELLULAR DISORDERS" filed Feb. 17, 2011, based on Patent Cooperation Treaty (PCT) Patent Appl. No. PCT/US2009/045681 titled "METHOD OF RECONSTITUTING CELLULAR SPECTRA USEFUL FOR DETECTING CELLULAR DISORDERS" having international filing date May 29, 2009, and claiming priority to U.S. Patent Appl. No. 61/056,955 titled "METHOD OF RECONSTITUTING CELLULAR SPECTRA FROM SPECTRAL MAPPING DATA" filed May 29, 2008, which is now U.S. Pat. No. 8,428,320, issued Apr. 23, 2013; U.S. Provisional Patent Appl. No. 61/358,606 titled "DIGITAL STAINING OF HISTOPATHOLOGICAL SPECIMENS VIA SPECTRAL HISTOPATHOLOGY" filed Jun. 25, 2010; to U.S. patent application Ser. No. 13/084,287 titled "TUNABLE LASER-BASED INFRARED IMAGING SYSTEM AND METHOD OF USE THEREOF" filed Apr. 11, 2011; and to U.S. patent application Ser. No. 13/067,777 titled "METHOD FOR ANALYZING SPECIMENS BY SPECTRAL IMAGING" filed Jun. 24, 2011. The entirety of each of the foregoing applications is hereby incorporated by reference herein.

BACKGROUND

One problem that exists in the art today is that there remains a lack of methods and systems that both improve detection of abnormalities in biological samples and deliver analytical results to a practitioner.

In the related art, a number of diseases may be diagnosed using classical cytopathology and histopathology methods involving examination of nuclear and cellular morphology and staining patterns. Typically, such diagnosis occurs via examining up to 10,000 cells in a biological sample and finding about 10 to 50 cells or a small section of tissue that may be abnormal. This finding is based on subjective interpretation of visual microscopic inspection of the cells in the sample.

An example of classical cytology dates back to the middle of the last century, when Papanicolaou introduced a method to monitor the onset of cervical disease by a test, commonly known as the "Pap" test. For this test, cells are exfoliated using a spatula or brush, and deposited on a microscope slide for examination. In the original implementation of the test, the exfoliation brush was smeared onto a microscope slide, hence the name "Pap smear." Subsequently, the cells were stained with hematoxylin/eosin (H&E) or a "Pap stain" (which consists of H&E and several other counterstains), and were inspected visually by a cytologist or cyto-technician, using a low power microscope.

The microscopic view of such samples often shows clumping of cells and contamination by cellular debris and blood-based cells (erythrocytes and leukocytes/lymphocytes). Accordingly, the original "Pap-test" had very high rates of false-positive and false-negative diagnoses. Modern, liquid-based methods (such as cyto-centrifugation, the ThinPrep® or the Surepath® methods) have provided improved cellular samples by eliminating cell clumping and removing confounding cell types.

However, although methods for the preparation of samples of exfoliated cells on microscope slides have improved substantially, the diagnostic step of the related art still typically relies on visual inspection and comparison of the results with a data base in the cytologist's memory. Thus, the diagnosis is still inherently subjective and associated with low inter- and intra-observer reproducibility. To alleviate this aspect, other related art automated visual light image analysis systems have been introduced to aid cytologists in the visual inspection of cells. However, since the distinction between atypia and low grades of dysplasia is extremely difficult, such related art automatic, image-based methods have not substantially reduced the actual burden of responsibility on the cytologist.

In classical histopathology, tissue sections, rather than exfoliated individual cells, are inspected by a pathologist using a microscope after suitable staining of the tissue. To detect abnormalities, the pathologist focuses on gross tissue architecture, cell morphology, nuclear morphology, nucleus-to-cytoplasm ratio, chromatin distribution, presence of mitotic figures, and others. Since these criteria are morphology-based, their interpretation always will be somewhat subjective. Immuno-histochemical and other more recent methods are often used to augment the pathologist's subjective assessment of a tissue diagnosis.

Spectral methods have also been applied in the related art to the histopathological diagnosis of tissue sections available from biopsy. The data acquisition for this approach, referred to as "Spectral Histopathology (SHP)," can be carried out using the same spectral methodology used for spectral cytopathology ("SCP").

In some methods of the related art, a broadband infrared (IR) or other light output is transmitted to a sample (e.g., a tissue sample), using instrumentation, such as an interferometer, to create an interference pattern. Reflected and/or transmitted light is then detected, typically as an interference pattern. A Fast Fourier Transform (FFT) may then be performed on the detected pattern to obtain spectral information relating to each sample pixel. The resulting information is referred to as a pixel spectrum.

One limitation of the FFT based related art process is that the amount of radiative energy available per unit time in each band pass may be very low, due to use of a broadband infrared spectrum emission. As a result, the data available for processing with this approach is generally inherently noise limited. Further, in order to discriminate the received data from background noise, for example, with such low energy levels available, high sensitivity instruments must be used, such as high sensitivity liquid nitrogen cooled detectors (the cooling alleviates the effects of background IR interference). Among other drawbacks, such related art systems may incur great costs, footprint, and energy usage.

There remains an unmet need in the art for devices, methods, and systems for transmitting and detecting IR and/or other similar transmissions for use, for example, for imaging tissue samples and other samples under ambient conditions for such purposes as the classification of diseases for diagnosis, prognosis, therapies and/or prediction of diseases and/or conditions. There also remains an unmet need in the art for systems and method for providing the analytical results to a practitioner.

SUMMARY OF THE INVENTION

Aspects of the present invention relate to systems and methods of analysis of imaging data and assessment of imaged samples, including tissue samples, to provide a classification of a biological sample into diagnosis, prognosis, predictive, and therapeutic classes. More specifically, aspects of the present invention are directed to systems and methods for receiving biological samples and providing analysis of the biological sample data to assist in medical diagnosis.

Aspects of the present invention include methods, devices, and systems for imaging tissue and other samples using IR spectral information from non-coherent as well as coherent sources, such as a broad-band, tunable quantum cascade laser (QCL) or optical parametric oscillators (OPSs) designed for the rapid collection of infrared microscopic data for medical diagnostics across a wide range of discrete spectral increments. The infrared data may be processed by an SHP system to provide analytical data, a medical diagnosis, a prognosis, and/or predictive analysis.

Such methods, devices, and systems may be used to detect abnormalities in biological samples, for example, before such abnormalities may be diagnosed using related art cytopathological or histopathological methods.

The methods, devices, and systems may be used, for example, to conveniently allow a practitioner to obtain information regarding a biological sample, including analytical data and/or a medical diagnosis.

The methods, devices, and systems may also be used to train one or more machine learning methods or algorithms to provide a diagnosis, prognosis, therapeutic, sub-typing, and/or predictive classification of a biological sample. In addition, the methods, devices, and systems may be used to generate one or more classification models that may be used to perform a medical diagnosis, prognosis, therapeutic, sub-typing, and/or predictive analysis of a biological sample.

The methods, devices and systems may be used to generate a confidence value for the predictive classifications generated. The confidence value may be included in a confidence prediction image. In addition, the confidence value may be included in a confidence prediction report.

The methods, devices, and systems may also be used to identify and assign new classes and/or sub-types of cancers. In addition, the methods, devices, and systems may be used to grade the predictive classifications generated. The grade may provide a degree of development of the cancer, for example. In addition, the predictive classifications and grade may be used to perform a medical diagnosis and/or prognosis of a biological sample. The predictive classification may also be used to associate a patient to therapy populations based on the disease state (e.g., the degree of development of the cancer).

In addition, the methods, devices, and systems may be used to direct harvesting material for molecular gene sequencing analysis for therapy. The methods, devices and systems may be used to annotate the gene expression of a biological sample.

Additional advantages and novel features relating to variations of the present invention will be set forth in part in the description that follows, and in part will become more apparent to those skilled in the art upon examination of the following or upon learning by practice of aspects thereof.

BRIEF DESCRIPTION OF THE FIGURES

Aspects of the present invention will become fully understood from the detailed description given herein below and the accompanying drawings, which are given by way of illustration and example only, and thus not limited with respect to aspects thereof, wherein:

FIG. 6A is a color Photostat of an example true image (the actual annotation) in accordance with an aspect of the present invention;

FIG. 6B is a color Photostat of an example of a SHP prediction image in accordance with an aspect of the present invention;

FIG. 6C is a color Photostat of an example of a confidence prediction image in accordance with an aspect of the present invention;

FIG. 10 is a color Photostat of an example confidence prediction image in accordance with an aspect of the present invention;

FIG. 11 is a color Photostat of an example true image in accordance with an aspect of the present invention;

FIG. 12 is a color Photostat of an example prediction image in accordance with an aspect of the present invention;

FIG. 14B is a color Photostat of an example classification of benign and malignant tumors in accordance with an aspect of the present invention FIG. 14C illustrates an example algorithm structure to use in accordance with an aspect of the present invention where A, B, C and D may indicate certain tissue conditions, classes or sub-types;

FIG. 15 is a color Photostat of an example classification report in accordance with an aspect of the present invention;

FIG. 16 illustrates an example validation report in accordance with an aspect of the present invention;

DETAILED DESCRIPTION

Figure 1:
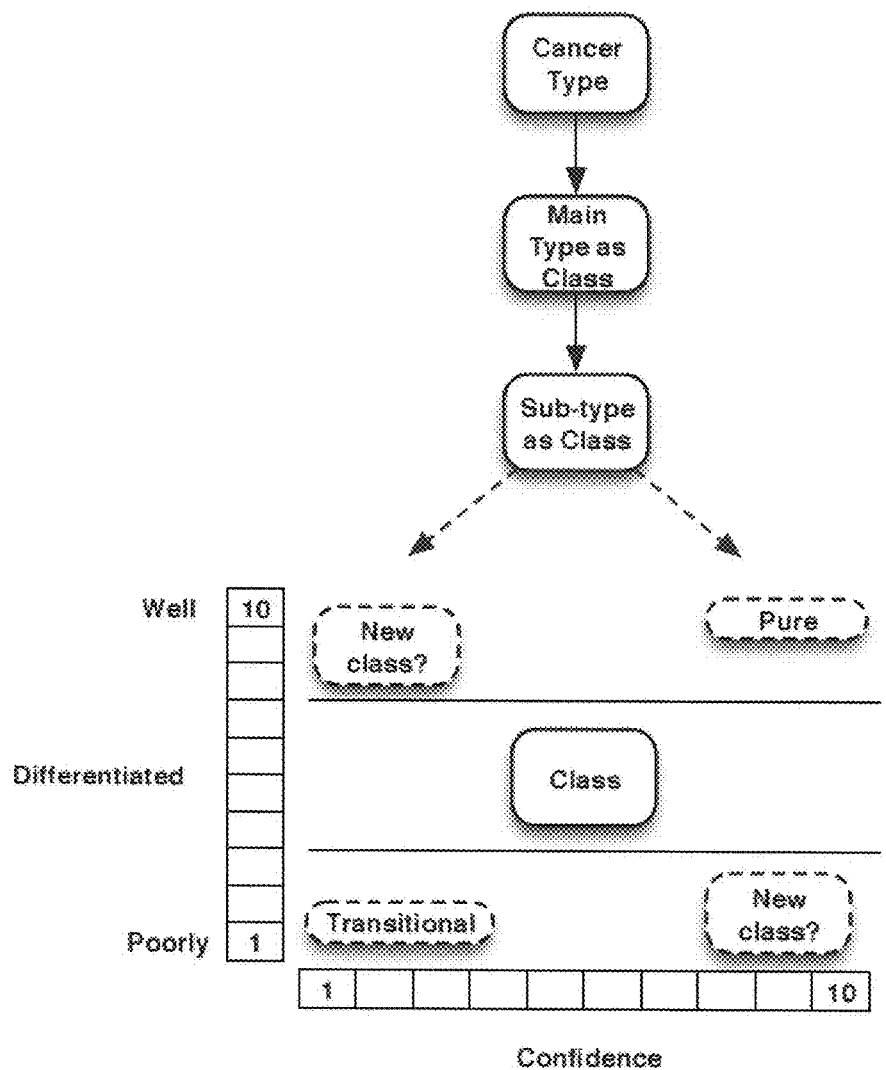
FIG. 1 illustrates an example of identifying disease states using confidence values and differentiation values to aid in the identification of classes of cancers in a biological sample in accordance with an aspect of the present invention; The figure shows where novel new classes or sub-types might be found (i.e., high differentiated/low confidence regions or low differentiation/high confidence regions)

Aspects of the present invention include methods, systems, and devices for classifying a biological sample into diagnosis, prognosis, and therapeutic classes to provide analytical data, medical diagnosis, prognosis, therapeutic and/or predictive analysis of a biological sample.

In addition, the methods, devices and systems may be used to generate a confidence value for the predictive classifications generated, for example. A confidence value may illustrate a level of confidence that a disease may be present in a biological sample or regions of a biological sample. For example, the confidence value may illustrate a 90% level of confidence that a disease may be present in a biological sample. In another example, the confidence value may illustrate a 3% level of confidence that a disease may be present in a biological sample. In an aspect, a confidence value may be included in a confidence prediction image. For example, the confidence prediction image may include a visual representation of a confidence value across a biological sample or within a region of a biological sample. The confidence images may be used adjunctively to aid a medical practitioner in providing a diagnosis. In addition, the confidence images may be used to drive areas of interest for micro-dissection.

Moreover, the confidence images and confidence values reports may also be used, for example, to visibly illustrate overlapping disease states and/or margins of the disease types for heterogeneous diseases and the level of confidence associated with the overlapping disease states. Thus, a medical profession may be able to use to the prediction report to identify a prominent disease identified in a biological sample, along with any other diseases that may be present in the biological sample.

The methods, devices, and systems may also be used to grade the cancer identified in the predictive classifications generated (e.g., the class and/or sub-class of cancer identified). The grade may provide a degree of development of the cancer from an early stage of development to a well-developed cancer. For example, the grade may be a numerical grade, such as Grade 1, Grade 2, Grade 3, etc. In addition, the grade may be described, for example, in reference to a range, such as a "High Grade," a "Low Grade", and an "Intermediate Grade." A grade of a disease may be determined through a subjective interpretation of biological sample by a pathologist. However, the system may apply a grade to the predictive classifications generated for a biological sample. In an aspect, the system may receive a biochemical signature of the biological sample and may use the biochemical signature to determine the grade of the predictive classifications. A medical professional may be able to receive a report with one or more classes and/or sub-classes of cancers identified in a biological sample, along with a level of development for the classes and/or sub-classes of the cancers identified. Thus, the predictive classifications and grade(s) may be used by the system to provide a medical diagnosis and/or prognosis of a biological sample. In addition, the predictive classifications and grade(s) may be used to drive therapeutic decisions relating to the biological sample.

In an aspect, the system may determine a differentiation value of the sample to aid in determining a grade or level of development of the disease. The differentiation value may be a quantitative measure for the grade or level of development of the disease. A low differentiation value may indicate, for example, that a particular disease identified in the sample has not developed, a disease is in an early stage of development, and/or a different type of disease may be present. A medium differentiation value may, for example, indicate that a particular disease is developing in the biological sample. While a high differentiation value may, for example, indicate that a particular disease present in the biological sample may be more developed. In addition, a low differentiation value may indicate, for example, regions of the sample that are poorly differentiated, while a high differentiation value may indicate regions of the sample that are well differentiated.

Figures 9A, 9B:
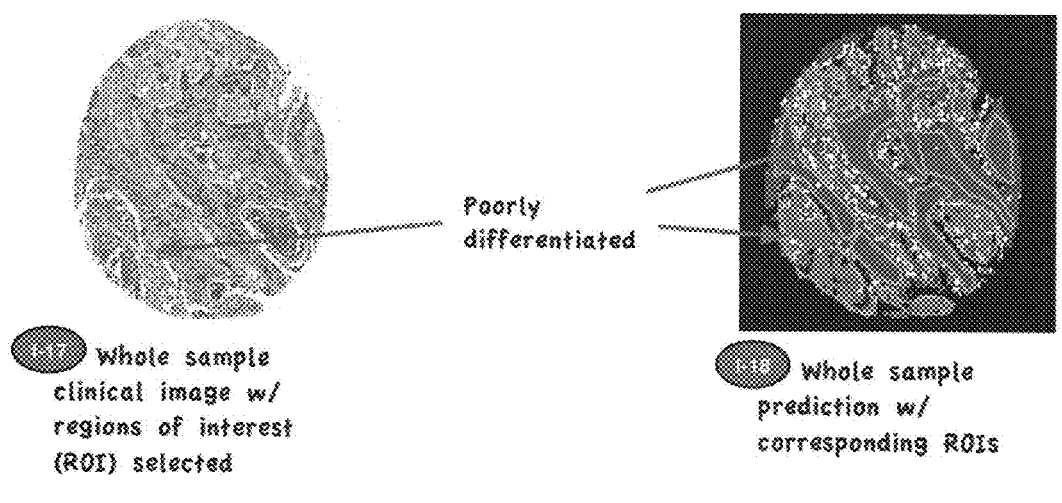
FIGS. 9A and 9B are color Photostats of images with regions of interest selected (some of which are poorly differentiated) in accordance with an aspect of the present invention.

A poorly differentiated region may include a region of the true image where the information identified in the biological sample (e.g., morphologic features) used to diagnose a disease may not be well developed. A true image may include, for example, an annotated image by a medical professional indicating a type of disease, such as a class and/or sub-class of cancer, if any, maybe be present in a biological sample. For example, a poorly differentiated region may occur where information may not be crisp in the image. FIGS. 9A and 9B illustrate example images with poorly differentiated regions. A highly differentiated region may include a region of the true image where the information identified in the biological sample used to diagnose disease may be well developed. For example, a highly differentiated region may occur where the information appears to be a class or sub-class of cancer.

The system may determine whether a region of a biological sample is poorly differentiated or highly differentiated by analyzing an annotation associated with a true image of the sample. For example, a medical professional may annotate a true image of the sample by identifying region(s) of an image where the features are a low quality, medium quality, or a high quality. The system may also determine whether a region of a sample is poorly differentiated or highly differentiated through spectral analysis of the prediction image. For example, the system may determine an area of the spectra with a poor performance. In addition, the system may determine an area of the spectra with a high performance.

The methods, devices, and systems may be used to identify normal areas of a biological sample, classes, and/or sub-classes of cancers present in a biological sample, and/or assign new classes or sub-types of cancers to the biological sample, as illustrated in FIG. 1. Referring now to FIG. 1, illustrated is an example graph 100 for using confidence values and differentiation values to aid in the identification of classes of cancers in a biological sample, in accordance with an aspect of the present invention. Graph 100 illustrates on the y-axis a range of differentiation values from 1 to 10, where 1 represents a poorly differentiated sample and 10 represents a well differentiated sample. In addition, graph 100 illustrates on the x-axis a range of confidence values from 1 to 10, where 1 represents a low confidence value and 10 represents a high confidence value.

Transitional regions may include regions of the biological sample where disease(s) may be starting to develop in the biological sample. Different diseases may appear similar in early developmental stages. As such, transitional regions may identify a plurality of diseases in the biological sample. Pure regions may include regions of the biological sample where a disease is highly developed.

Figure 2:
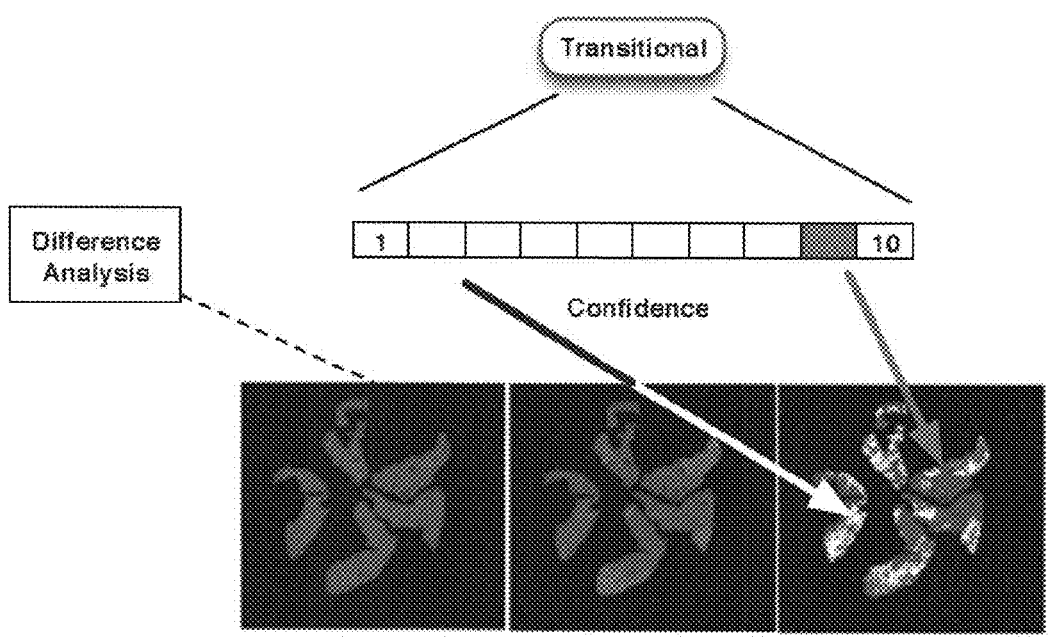
FIG. 2 is a color Photostat of an example of SHP analysis of a region in a biological sample where two different diagnostic regions (blue and magenta) abut, and where the regions of diagnostic uncertainty (low confidence) are indicated by white areas in accordance with an aspect of the present invention.

Referring now to FIG. 2, illustrated therein is an example analysis of a transitional region in accordance with an aspect of the present invention. FIG. 2 illustrates an example confidence prediction image (e.g., the image on the far right of FIG. 2) that may be generated by the system based on the analysis of a transitional region of the biological sample identified in FIG. 1. For example, the confidence prediction image illustrates how confident the system may be that a particular class of cancer may be present in the transitional region.

In an aspect, new classes may be identified in a biological sample when a sample is well differentiated but there may be a low confidence level for the type of class or sub-class identified in the biological sample. In addition, a new class may be identified in a biological sample when a sample is poorly differentiated, but where a high confidence level is present. A high confidence level may be determined, for example, via spectral analysis. For example, a signal where the spectra from the prediction image is pure (e.g., the signal is not mixed with other spectra), the confidence level may be high. However, a signal where the spectra from the prediction image is mixed (e.g., the signal is mixed with other spectra from different classes), the confidence level may be lower.

New classes may also be identified in a biological sample when a disagreement occurs between a true image (e.g., an annotated image by a medical professional indicating what type of cancer, if any, is present in a biological sample) and a prediction image (e.g., a spectral image indicating what type of cancer, if any, is present in a biological sample based upon spectral analysis), as discussed in further detail below in conjunction with FIG. 3.

In an aspect, a confidence value may be used in cooperation with the differentiation value to identify a class or classes of cancer present in a biological sample. Identifying new classes of cancer is discussed in more detail in conjunction with FIG. 3.

Figure 3:
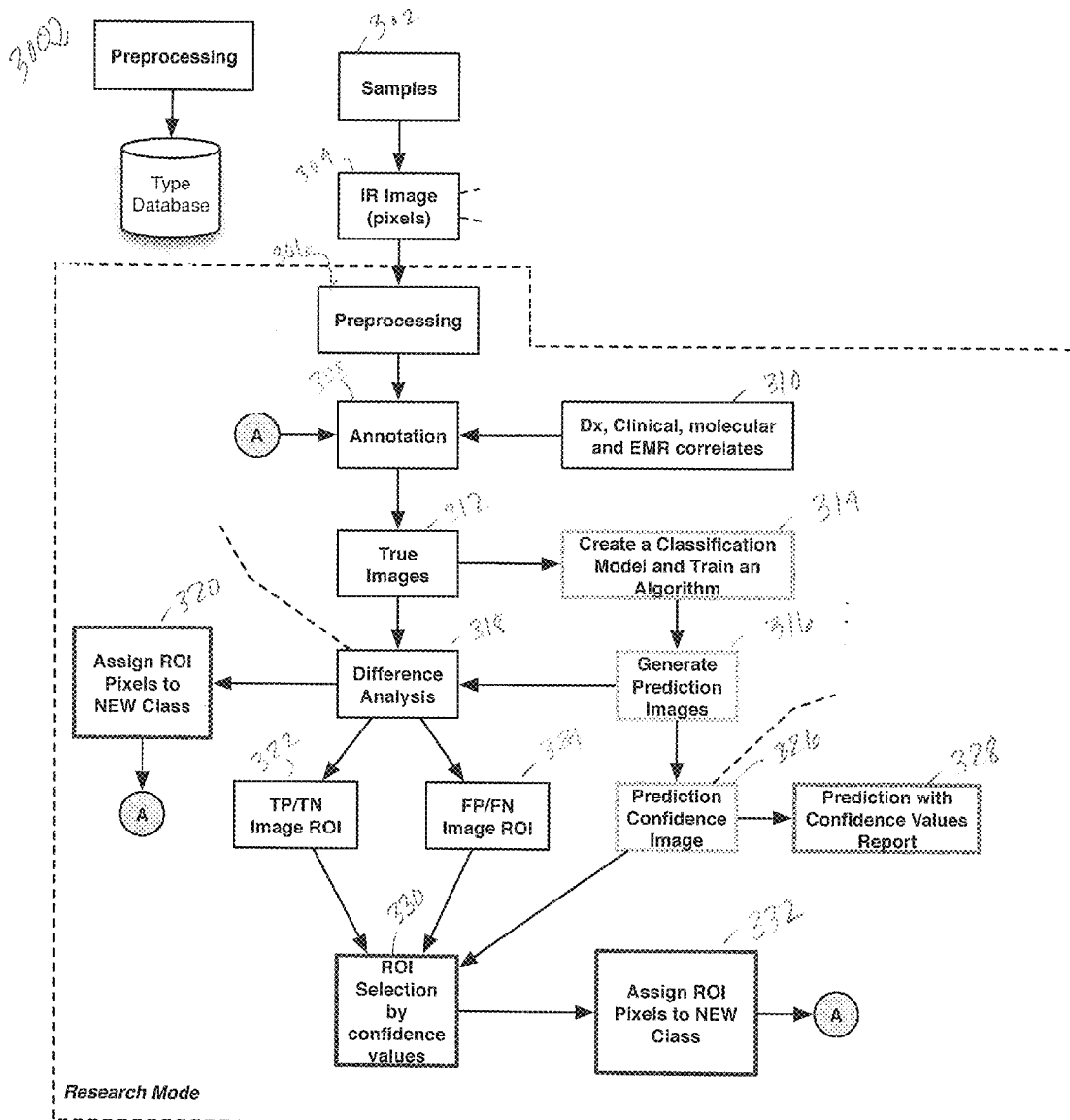
FIG. 3 illustrates an example of the method flow for analyzing a spectral dataset from a biological specimen to provide a diagnosis, prognosis, and/or predictive classification of a disease or condition in accordance with an aspect of the present invention as well as identify novel new classes and sub-types.

Referring now to FIG. 3, illustrated therein is an example method flow 300 for analyzing a biological specimen to provide a diagnosis, prognosis, and/or predictive classification of a disease or condition, in accordance with an aspect of the present invention. Method 300 may also be used for identifying sub-classifications of cancer, in accordance with an aspect of the present invention. In addition, method 300 may also be used for differentiation of normal tissue with respect to a cancerous lesion (e.g., a differentiation of normal tissue proximal to a cancerous lesion and normal tissue at a distal location from the cancerous lesion), in accordance with an aspect of the present invention.

The method may include receiving biological samples 302. The biological sample may include tissue or cellular material from an individual, such as a human or animal. The biological sample may be obtained by a practitioner via any known methods. The sample may, for example, include a microtome section of tissue from, among other sources, biopsies, a deposit of cells from a sample of exfoliated cells, or Fine Needle Aspiration (FNA). However, this disclosure is not limited to these biological samples, but may include any sample for which spatially resolved infrared spectroscopic information may be desired.

A variety of cells or tissues may be examined using the present methodology. Such cells may comprise exfoliated cells, including epithelial cells. Epithelial cells are categorized as squamous epithelial cells (simple or stratified, and keratinized, or non-keratinized), columnar epithelial cells (simple, stratified, or pseudostratified; and ciliated or non-ciliated), and cuboidal epithelial cells (simple or stratified, ciliated or nonciliated). These epithelial cells line various organs throughout the body, such as the intestines, ovaries, male germinal tissue, the respiratory system, cornea, nose, and kidney. Glandular epithelial cells are a type of epithelial cell that may be found lining the throat, stomach, blood vessels, the lymph system, and the tongue. Mesothelial cells are a type of epithelial cell that may be found lining body cavities. Urothelial cells are a type of epithelial cell that may be found lining the bladder. Endothelial cells are found lining blood vessels.

In an aspect, the system may have a receiving module operable to receive the biological sample. In another aspect, the system may receive data corresponding to the biological sample. For example, an individual may provide data corresponding to the biological sample to the system.

The method may also include generating a spectral image of the biological sample 304. In an aspect, the system may collect spectral data of biological sample to generate a spectral image of the biological sample. Spectral data may include any suitable data that is based on methods including, but not limited to infrared, Raman and related techniques such as surface or tip enhanced Raman as well as non-linear Raman techniques such as coherent anti-Stokes Raman and stimulated femtosecond Raman effect, visible, terahertz, and fluorescence spectroscopy. Infrared spectroscopy may include, but is not limited to, attenuated total reflectance Fourier transform infrared spectroscopy (ATR-FTIR) as well as other infrared reflectance measurements. In general, infrared spectroscopy may be used because of its fingerprint sensitivity, which is also exhibited by Raman spectroscopy. Infrared spectroscopy may be used with larger tissue sections and to provide a dataset with a more manageable size than Raman spectroscopy, for example. Furthermore, infrared spectroscopy data may be more amenable to fully automatic data acquisition and interpretation. Additionally, infrared spectroscopy has the necessary sensitivity and specificity for the detection of various tissue structures and diagnosis of disease.

In an aspect of the present invention, the spectral data may be obtained by the practitioner through a tunable laser-based infrared imaging system and method, which is described in related U.S. patent application Ser. No. 13/084,287. The data may be obtained by using an infrared tunable laser as a coherent light source, for example. The wavelength of IR transmissions from the tunable laser may be varied in discrete steps across a spectrum of interest, and the transmitted and/or reflected transmissions across the spectrum may be detected and used in image analysis. The data may also be obtained from a commercial Fourier transform infrared spectroscopy (FTIR) system using a non-laser based light source, such as a globar, synchrotron or other broad band light source.

One example laser usable in accordance with aspects of the present invention is a quantum cascade laser (QCL), which may allow variation in IR wavelength output between about five and 12 µm, for example. An array detector may be used to detect transmitted and/or reflected IR wavelength image information.

In one example implementation in accordance with aspects of the present invention, the beam of the QCL is optically conditioned to provide illumination of a macroscopic spot (ca. 5-8 mm in diameter) on an infrared reflecting or transmitting slide, on which the infrared beam interacts with the sample. The reflected or transmitted infrared beam is projected, via suitable image optics, to an infrared array detector, which samples the complete illuminated area at a pixel size smaller than or about the same as the diffraction limit.

The infrared spectra of voxels of tissue or cells represent a snapshot of the entire chemical or biochemical composition of the sample voxel. This infrared spectrum is the spectral data used to generate a spectral image 304. While the above description serves as a summary example of how and what spectral data may be obtained, a more detailed disclosure of example steps involved in obtaining the data is provided in U.S. patent application Ser. No. 13/084,287.

In an aspect, after the data has been acquired by the practitioner, e.g., the spectral data and biological samples, among other data, may be transmitted to an SHP system. For example, the SHP system may have a receiving module operable to receive the transmitted data. The data may be automatically or manually entered into an electronic device capable of transmitting data, such as a computer, mobile telephone, personal digital assistant (PDA), or other handheld device, and the like. In an aspect of the present invention, the SHP system may include a computer located at a remote site having appropriate algorithms to analyze the data. In another aspect of the present invention, the SHP system may include a computer located within the same local area network as the electronic device into which the data has been entered or may be on the same electronic device into which the data has been entered (e.g., the practitioner may enter the data directly into the device that analyzes the data). If the SHP system is located remotely from the electronic device, the data may be transferred to the SHP system via any suitable electronic transferring methods, such as to a local computer via a local area network, or over the Internet. An example network layout and system for communicating the data to the SHP system is described in more detail below with respect to FIGS. 19 and 20.

In another aspect of the present invention, instead of the practitioner obtaining the data on the practitioner end and transmitting the data to the SHP system at a remote site, the sample itself may be sent to the SHP system. For example, the SHP system may have a receiving module operable to receive the sample. When the physical sample is sent to the SHP system, a practitioner operating the SHP system may instead obtain the spectral data. In this case, the biological sample may be physically delivered to the SHP system, for example, at the remote site, instead of just spectral data being delivered. However, the practitioner may still provide the clinical data, when applicable.

The method may further include performing preprocessing on the spectral image 306. Subjecting the spectral data to a form of preprocessing may be helpful, for example, in isolating the data pertaining to the cellular material of interest and to removing confounding spectral features, as discussed in more detail in related U.S. patent application Ser. No. 13/067,777.

Figure 5A:
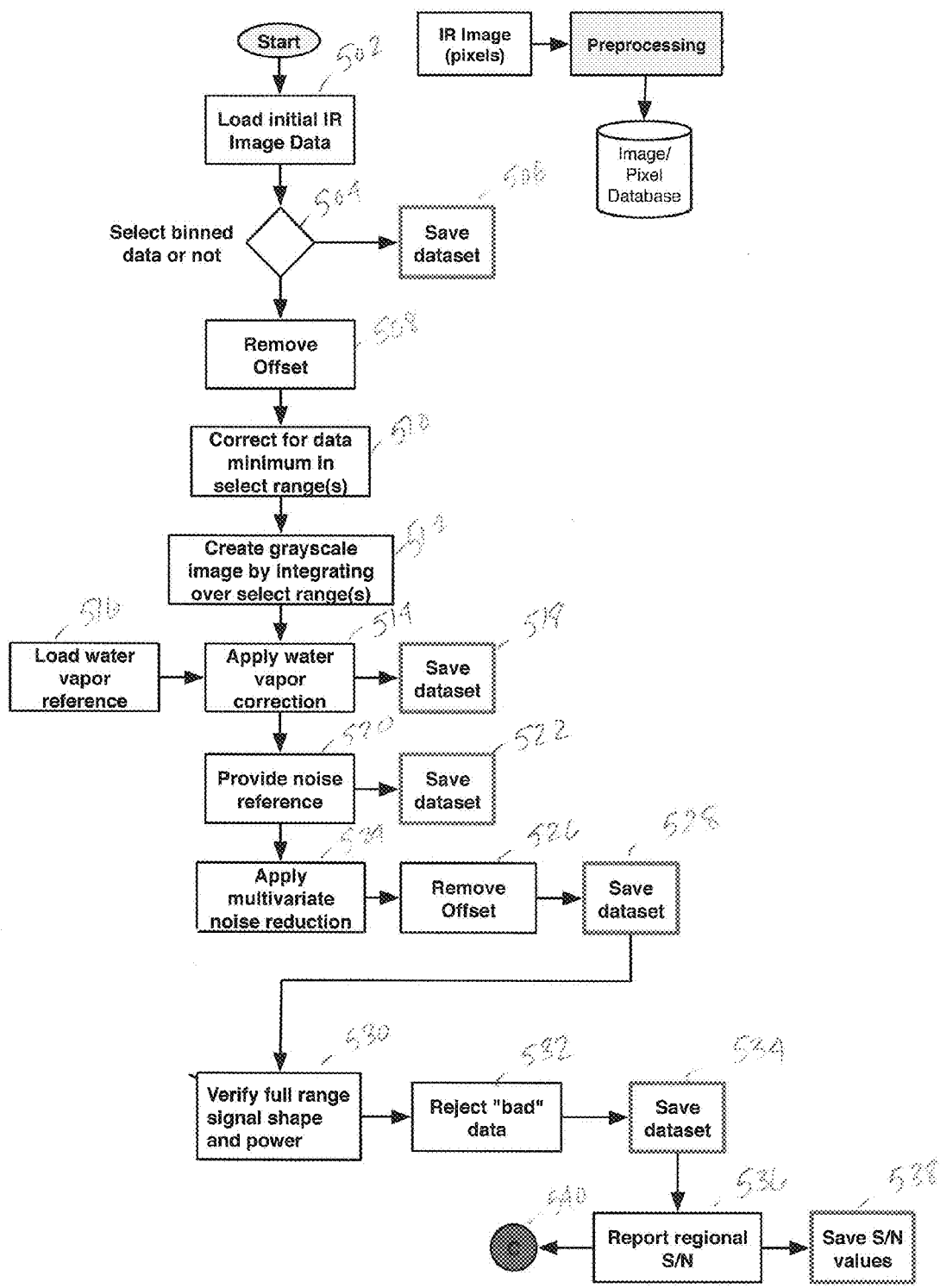
FIGS. 5A and 5B illustrate an example method flow for preprocessing IR image data in accordance with an aspect of the present invention.
Figure 5B:
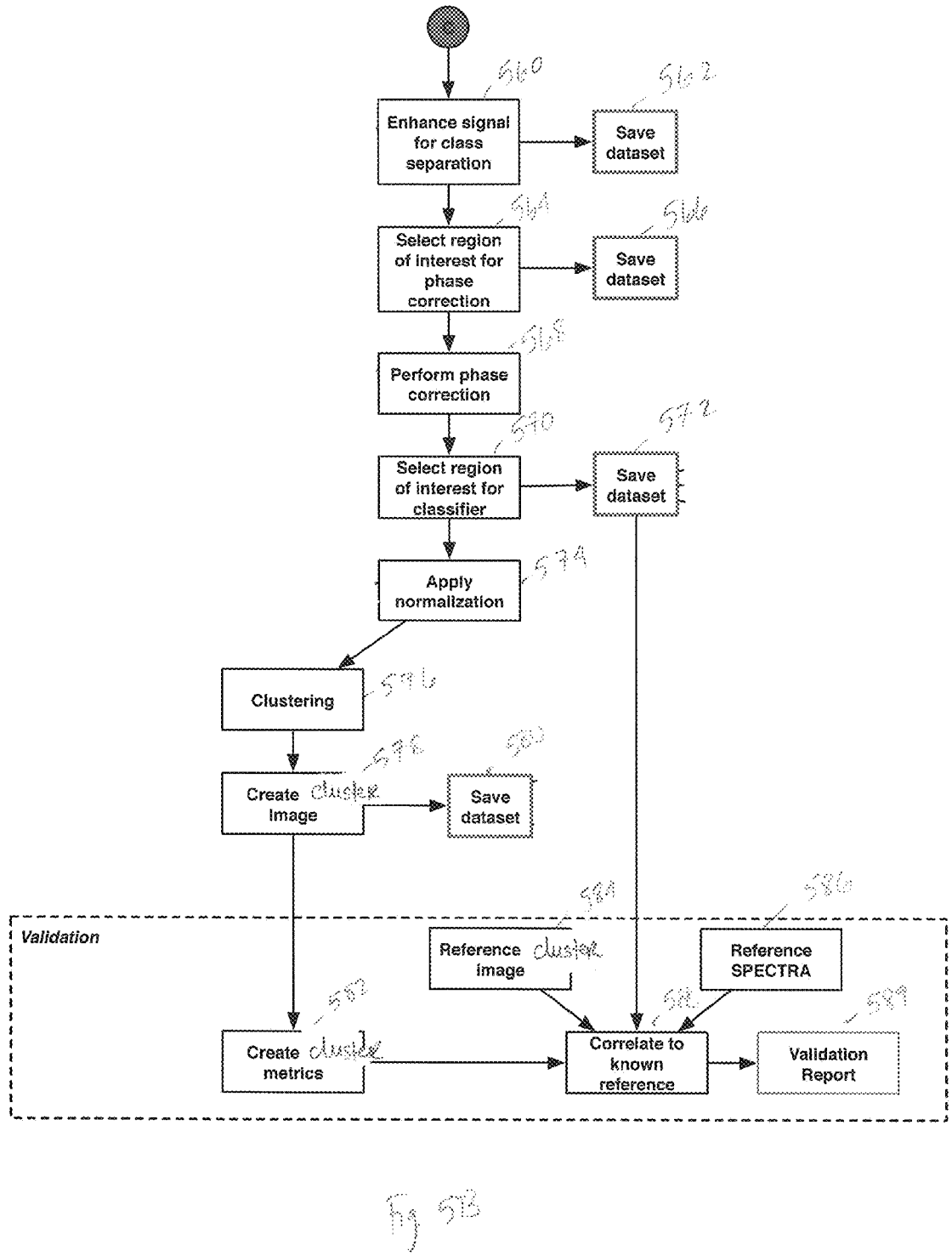

Referring now to FIGS. 5A and 5B, illustrated therein is an example method flow 500 for preprocessing in accordance with an aspect of the present invention. The method may include loading initial IR image data 502. For example, the system may load IR image data received by the system and/or previously stored in the system. In an aspect, the system may convert the IR image data received into absorbance units and calculate spectral parameters.

The method may also include selecting binned data 504 and saving the dataset 506. In an aspect, the system may bin the image data to reduce the number of pixels. Reducing the number of pixels may, for example, enhance signal to noise or other characteristics in the data. For example, the system may load the image file using 2×2 binning options. In addition, the system may store the dataset into a data store.

The method may include removing any offset 508 and correcting for data minimum in select range(s) 510. For example, the system may remove any baseline offset from the spectral data by processing the data from frequencies in the range.

The method may include creating a grayscale image by integrating over select range(s) 512. In an aspect, the system may create the grayscale image dataset by integrating spectral intensities between certain limits). For example, a grayscale image may allow pixels with any significant infrared intensity to be viewed before any filters are applied to the image.

The method may also include loading water vapor correction 516. For example, the system may load water vapor correction information to apply to spectra to correct for water vapor effects in the spectral image data.

The method may include applying water vapor correction 514 and saving the dataset 518. In an aspect, the system may use Multiplicative Signal Correction (MSC) to correct for residual water vib-rotational contributions.

The method may include providing noise reference 520 and saving the dataset 522. In an aspect, the system may separate the image dataset into noise and signal regions. For example, the system may assign the black areas of the grayscale image to the noise regions, and assign the shades of grey to the signal region. In an aspect, the separation of the noise and signal regions may be based on an integration of any spectral feature between two limiting wavelengths. When the integration value in this range exceeds a minimum value in the signal, the noise spectra may be defined if the integrated intensity is between the two specified limits.

The method may include applying multivariate noise reduction 524. For example, the system may perform principal component analysis (PCA) on the noise spectra that may be used to order the eigenvectors of the spectra in an order of decreasing noise contributions and reconstruct signal spectra of the dataset as the sum of the eigenvectors.

The method may include verifying full range signal shape and power 530. The method may also include rejecting "bad" data (e.g., data falling outside the range between the minimum and maximum values) 532 and saving the dataset 534. In an aspect, the system may perform one or more quality tests to verify the signal shape and power. Quality tests may include, but are not limited to, peak frequency location, band shape, total signal intensity, and band area ratios. In an aspect, the system may perform a quality test based on peak frequency. In yet another aspect, the system may perform a quality test based on total spectral integrated intensity by integrating between certain limits. The integrated intensity may be required to fall between a certain minimum value and a certain maximum value. In another aspect, the system may perform quality tests based on spectral integrated intensity within certain limits. Integrated intensities may be required to fall between a certain minimum value and a certain maximum value. In an aspect, the system may perform quality tests based on a peak area ratio between amide I and amide II bands by integrating between certain limits. In an example implementation, intensity ratios may be required to be between a certain minimum value and a certain maximum value.

The method may also include reporting regional signal to noise 536 and saving the signal to noise values 538. The system may receive inputs to calculate the signal to noise of the data. The inputs may include, for example, the left and right margins of a baseline region of interest, the left and right margins of the signal region of interest, and the left and right margins of the noise region of interest.

The method may further include enhancing signal for class separation 560 and saving the dataset 562. In an aspect, the system may apply a smoothing derivative to smooth, for example, window width, order, and derivative. The system may also apply a normalization to enhance the signal for class separation.

The method may include selecting region of interest for phase correction and saving the dataset 566. For example, the system may expand a spectral region of interest between certain values and select the spectral region of interest for phase correction.

The method may include performing phase correction on the selected region of interest 568. Phase correction may include, for example, transforming the 512 data point $2^{nd}$ derivative spectral vector by a finite Hilbert transform (truncated FFT) and split into real and imaginary parts. In an aspect, the system may perform a coordinate transformation and a new spectral vector may be created. The system may select a phase corrected trial spectra with the highest frequency reference peak between a range of values as the corrected spectra. Phase correction is described in more detail in U.S. patent application Ser. No. 13/067,777.

The method may also include selecting a region of interest for a classifier 574. For example, the system may expand the region of interest between a range of values.

The method may also include applying normalization 574. Normalization may include, but is not limited to, vector normalization, standard normal variate, and multiple regions. The system may apply a normalization to the region of interest.

The method may include clustering 576. For example, the system may also perform a clustering.

The method may create cluster images 578 and saving the dataset 580. The system may create and store cluster images.

The method may include different metrics 582 to create cluster images. These include correlating and distance calculations. The method may include generating a validation report 589. For example, the system may create clustering metrics and correlate the cluster image to known references. Clustering metrics may include, but are not limited to, k-means clustering and hierarchical cluster analysis (HCA). In addition, the system may generate a validation report. An example validation report is illustrated in FIG. 16.

Referring to FIG. 3, the method may further include receiving clinical information during the annotation process 310. In an aspect, the system may receive clinical information from a medical practitioner, an electronic medical record of a patient, or other data source, such as a data repository that may include clinical data. Clinical information may include, for example, any information that may be relevant to a diagnosis and/or prognoses, including the type of cells likely present in the sample, the part of the body from which the sample was taken, and the type of disease or condition likely present, among other diagnoses. In addition, clinical information may include a clinical "gold standard" for accepted practices for the current state-of-the-art. For example, clinical "gold standards" may include using stains on biological samples such as, but not limited to, immunohistochemical (IHC) stains and panels, hematoxylin stains, eosin stains, and Papanicolaou stains. In addition, clinical "gold standards" may also include using a microscope to measure and identify features in a biological sample including staining patterns.

The method may also include receiving annotation information for the IR image 308. Annotation information may include, but is not limited to, any suitable clinical data regarding the selected annotation region, such as data that may be relevant to a diagnosis, including, for example, biochemical signatures as correlated to a feature of a type of cells and/or tissues that are likely present in the sample; staining grades of the sample; intensities; molecular marker status (e.g., molecular marker status of IHC stains); the part of the body from which the sample was taken; and/or the type of disease or condition likely present. In addition, the annotation information may relate to any measurable aspects on the visual image of the sample. The annotation information may also include, for example, a time stamp (e.g., a date and/or time when the annotation was created), parent file annotation identifier information (e.g., whether the annotation is part of an annotation set), user information (e.g., name of user who created the annotation), cluster information, cluster spectra pixel information, cluster level information, and number of pixels in the selected region, among other information relating to the annotation. It should be noted that the system may receive the annotation information from a user, such as a practitioner.

In an aspect, the user may select an annotation region of the registered spectral image and may provide the annotation information for the selected region. The user may use the system to select a region of the registered image that corresponds to a biochemical signature of a disease and/or condition. For example, the user may place a boundary around an area in the spectral image where the spectra of pixels of the spectral image appear to be generally uniform (e.g., the color in the area of the spectral image is mostly the same color). The boundary may identify a plurality of pixels in the spectral image that correspond to a biochemical signature of a disease or condition. In another aspect, the user may select an annotation region based upon one or more attributes or features of the visual image. Thus, the annotation region may correspond to a variety of visual attributes of the biological sample, as well as biochemical states of the biological sample. Annotation regions are discussed in more detail in U.S. patent application Ser. No. 13/507,386. It should also be noted that the user may select an annotation region of the registered spectral image that does not correspond to a biochemical signature of a disease or condition.

In another aspect, the system may automatically or otherwise (e.g., with some user assistance or input parameters) provide the annotation information for the selected annotation region, as discussed in more detail in U.S. patent application Ser. No. 13/645,970. For example, the system may provide the date and time the annotation was created, along with the cluster information for the selected region. In addition, the system may automatically or otherwise select the annotation region of the registered spectral image and provide the clinical data (e.g., data that may be relevant to a diagnosis and/or prognosis, and classifications of a disease or condition) for the selected annotation region.

In an aspect, the system may review some or all of the cluster levels of the spectral image and may identify a cluster level where the spectral clusters of pixels are relatively uniform (e.g., a homogeneous spectral cluster of pixels with similar spectra, per a predetermined parameter). In an aspect, the system may present each homogeneous spectral cluster as a single color (e.g., blue for one cluster and red for a different cluster). The system may compare the identified cluster level with the cluster level for the selected annotation region of the spectral image, and, if the system determines that a match occurs, the system may determine that another level or cluster level should not be selected for the annotation region.

While the above description serves as a summary of an example annotation process, a more detailed disclosure of an example annotation is provided in U.S. patent application Ser. No. 13/645,970.

The method may include generating a true image 312. A true image may be, for example, a visual image of the biological sample that may include an annotation region. The visual image of the sample may be obtained using a standard visual microscope, such as of a type commonly used in pathology laboratories. The microscope may be coupled to a high resolution digital camera that captures the field of view of the microscope digitally. This digital real-time image may be based on the standard microscopic view of a sample, and may be indicative of tissue architecture, cell morphology, and staining patterns. The image may be stained, e.g., with hematoxylin and eosin (H&E) and/or other constituents, immuno-histochemicals, Insitu-hybridization (ISH), etc., or unstained.

Figure 8A:
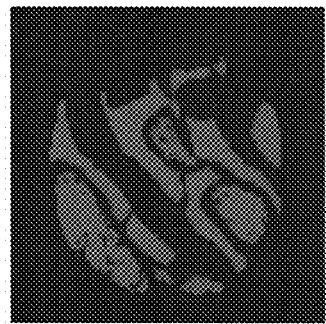
FIG. 8A is a color Photostat of an example of a true image, based on pathology-based annotation, in accordance with an aspect of the present invention.

Examples of true images are illustrated in FIGS. 6A, 8A, and 11. FIGS. 6A and 11 illustrate an image with Adenocarcinoma (ADC) cancer regions annotated in a biological sample. For example, the dark blue region of the image illustrates annotation regions in the biological sample, where a medical practitioner or other user has identified ADC in the biological sample. In addition, FIG. 8A illustrates a true image of an entire biological sample with regions of ADC identified in the biological sample (e.g., the blue regions of the image).

The method may also include creating a classification model and training a classifier algorithm 314. The system may be used to train algorithms to provide a diagnosis, prognosis and/or predictive classification of a disease or condition, such as is described in a more detailed example in U.S. patent application Ser. No. 13/645,970. In addition, the system may be used to form one or more classification models for diagnosing diseases, as described in more detail in U.S. patent application Ser. No. 13/645,970. In an example aspect, a data repository may include a set of listed tissue or cellular classes. Classes may be derived from and may be listed, for example, to reflect expert opinions, group decisions, and/or individual and institutional standards. Thus, the algorithms used to provide a diagnosis and/or a prognosis or predictive analysis for a biological sample may be trained to implement expert practices and standards, which may vary from institution to institution and among individuals.

For example, the system may receive a query with one or more parameters for training, and testing features that may be correlated to a biological signature representative of the particular disease, condition, feature state, and/or class. The parameters may include, but are not limited to, a disease or condition type (e.g., lung cancer or kidney cancer), cell or tissue class, tissue type, disease state, classification level, spectral class, and tissue location, among other parameters. In an aspect, the system may receive the query and the parameters from a user of the system. In another aspect, the system may automatically or otherwise determine the parameters that should be used for the focused on a particular disease or condition. Thus, the training and testing features may be customized based upon the parameters received.

The system may extract pixels from the visual and spectral images stored in a data repository that correspond to the parameters for the training testing features. For example, the system may access the annotated images stored in the data repository, along with any suitable annotation information and/or meta-data corresponding to the annotated images. The system may compare the parameters of the query with the annotation information and/or meta-data of the annotated images. Upon a match occurring between the parameters and the annotation information and/or the meta-data, for example, the system may extract the pixels of the visual and spectral images associated with the parameters and form a training set of data. The pixels extracted for the training data may include pixels from different cells or tissues classes and/or tissue types. It should be noted that the pixels extracted from different tissue types may be stored as part of different testing features. Thus, for example, pixels from the same tissue type may be assigned to a single testing feature, while pixels from a different tissue type may be assigned to a different testing feature. In addition, the training data may include spectral data that is associated with specific diseases and/or conditions, and/or, for example, cell or tissue types (collectively, a "class"). Thus, the system may extract pixels of the visual and spectral images that may provide a meaningful representation of the disease or condition based upon the parameters provided for the training features, in order to provide a diagnosis, a prognosis, and/or predictive analysis of the disease or condition.

Verification tests may include, but are not limited to, quality tests and feature selection tests on the training set of data. In an aspect, the system may utilize the methodology (e.g., algorithm) created by the training set of data in conjunction with a testing set of data to verify the accuracy of the methodology or algorithm. The testing set of data may include biological samples that contain the particular disease or condition, along with biological samples that do not contain the particular disease or condition.

The system may verify the accuracy of the algorithm, for example, by determining whether the algorithm correctly identifies biological samples that contain the particular disease or condition and biological samples that do not contain the particular disease or condition. When the algorithm is able to correctly identify which biological samples contain the disease or condition and which biological samples do not contain the disease or condition, the system may determine that the accuracy of the algorithm is high. However, when the algorithm is not able to correctly identify which biological samples from the testing data contain the disease or condition or incorrectly identifies biological samples as containing the disease or condition, the system may determine that the accuracy of the algorithm is low. In an aspect, the results of the algorithm may be compared against an index value that may indicate the probability of whether the algorithm correctly identifies the biological samples. Index values above a threshold level may indicate a high probability that the algorithm correctly identified the biological samples, while index values below a threshold level may indicate a low probability that the algorithm correctly identifies the biological samples.

For example, upon the system determining that the accuracy of the algorithm is low, the system may refine the training set of data. The system may increase and/or decrease the number of pixels, for example, in order to increase the likelihood of statistically relevant performance of the algorithm. It should be noted that the number of pixels that are required for the training set of data may vary based upon the type of disease or condition the algorithm is trying to diagnose and/or the cell or tissue class selected, for example.

Upon the system determining that the algorithm has a high accuracy, the system may generate one or more trained algorithms to provide a diagnosis, a prognosis, and/or predictive analysis for the particular disease, based upon the testing features. It should be noted that a plurality of algorithms may be generated to provide such diagnosis, a prognosis, and/or predictive analysis for a disease, based upon the received parameters. For example, multiple algorithms may be trained to diagnose lung cancer, with each algorithm trained to diagnose a particular type of lung cancer, based upon different parameters that may be correlated and coupled to a biochemical signature representative of the disease or feature state, and class of the disease.

For example, the system may store the one or more trained algorithms in a data repository that also contains the annotated spectral and visual images, annotation information and/or meta-data.

The system may also be used to form one or more classification models for diagnosing diseases, such as is described in more detailed examples in U.S. patent application Ser. No. 13/645,970. For example, the system may combine various algorithms for diagnosing different forms of cancer (e.g., lung cancer, breast cancer, kidney cancer) to form one model for diagnosing cancer. It should be noted that the classification models may also include sub-models. Thus, the classification model for diagnosing cancer may have sub-models for diagnosing various forms of cancer (e.g., lung cancer, breast cancer, kidney cancer). Moreover, the sub-models may further include sub-models. As an example, the model for diagnosing lung cancer may have multiple sub-models for identifying the type of lung cancer that may be present in the biological sample.

In an aspect, the system may perform sub-typing of lung cancer by identifying main cancer types and benign, such as Benign, Small Cell Lung Cancer (SCLC), Adenocarcinoma (ADC), Squamous Carcinoma (SQCC) and Large Cell Lung Cancer (LCLC). The system may further identify sub-types of the main types of cancer identified and sub-types of the sub-types. Sub-types may include, but are not limited to, Lepidic, Acinar, Papillary, Micropapillary, Solid. In an aspect, the system may create one or more classification models for diagnosing diseases using the subtypes and types identified. For example, the system may classify the sub-types and types as classes of cancer in the classification models. The classes of cancer may be used in diagnosing a biological sample. In addition, the classes of cancer may be associated with therapy populations. Therapy populations may include, for example, appropriate therapies for a disease state. For example, the classes may be associated with a patient population that responds to a particular therapy for a disease state. As such, the system may use the classification models to provide recommendations for appropriate therapies (e.g. as a companion diagnostic modality, and in conjunction with literature data mining) to treat the disease identified in the class or sub-class.

Figure 14A:
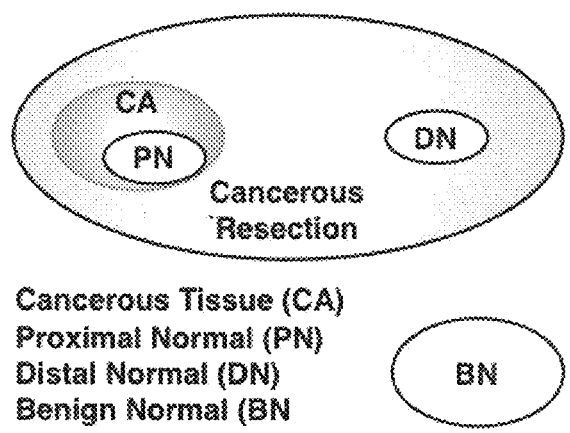
FIG. 14A is a color Photostat of an example classification of a biological sample in accordance with an aspect of the present invention.

In addition, the system may distinguish the disease types and sub-types from normal tissue (e.g., tissue presumed to have no relevant disease. The system may use the classes, for example, to distinguish heterogeneity of the biological sample. In an aspect, the system may differentiate normal tissue proximal to a cancerous lesion and normal tissue at a distal location from the cancerous lesion, as illustrated, for example, in FIG. 14A. FIG. 14 illustrates an example cancerous tissue (CA) with proximal normal (PN) tissue proximal to the cancerous tissue. FIG. 14A also illustrates distal normal (DN) tissue at a distal location from the cancerous tissue and benign normal (BN) tissue located outside of the cancer lesion. In an aspect, the system may analyze the proximal normal tissue, distal normal tissue and benign normal tissue. Normal tissue within a tumor may have a different signature than benign lesions. In addition, proximal normal tissue may have a different signature than distal normal tissue. For example, the signature of the proximal normal tissue may indicate emerging cancer in the proximal normal tissue, while the signature of the distal normal tissue may indicate a different disease state in the distal normal tissue. In an aspect, the system may use the proximity of the tissue to the cancerous tissue to measure, for example, a relevant strength of a disease, growth of a disease, and patterns of a disease. For example, the system may analyze the appropriate cell and tissue morphologic descriptor, such as stroma, connective tissue, and blood vessel wall.

Once the system identifies the various types and sub-types of cancer, the system may also identify variants of the types and sub-types. Variants may include modifiers that may occur along with any of the cancer types and histological subtypes, such as mucinous adenocarcinoma, colloidal, fetal (low and high grade) and enteric. In an aspect, the system may classify the variants as classes in the classification models.

FIG. 14B illustrates an example classification of benign and malignant tumors in accordance with an aspect of the present invention. FIG. 14B illustrates an example sub-classification of Lung/Pulmonary benign lesions of Hamartoma, Sarcoidosis (granuloma) and Organizing Pneumonia types (blue) cluster separation versus lung cancer tumor normal types (red). 1402 illustrates an example sub-classification of Benign separated by SHP. 1404 illustrates an example sub-classification of necrosis, keratin pearls, and lepidic. 1406 illustrates an example Squamous grades classified automatically by SHP. 1408 illustrates an example sub-classification of adenocarcinoma.

The system may establish a rule set for determining an order for applying the methodologies (e.g., algorithms) within the classification model. In addition, the system may establish a rule set for placing constraints on when algorithms may be used. It should be noted that the rule set may vary based upon the diseases and/or the number of algorithms combined together to form the models, for example. Upon the system establishing a rule set for the models, the system may generate one or more models for diagnosing the particular disease. It should be noted that, in addition to the above method, a variety of other methods may be used for creating a classification model for a particular disease or condition.

One example rule set for applying the algorithms within the classification model may include a variation reduction order, determined using hierarchical cluster analysis (HCA) or other clustering/segmentation methods. An example of HCA is described in detail in U.S. patent application Ser. No. 13/067,777. As described in the '777 application, HCA identifies cellular and tissue classes that group together due to various similarities. Based on the HCA, the most effective order of the iterations, or variation reduction order, may be determined. That is, the iteration hierarchy/variation reduction order may be established based on the least to greatest variation in data, which is provided by HCA. By using HCA, based on the similarity or variance in the data, it may be determined which class of tissue or cell should be labeled and not included in the subsequent data subset, in order, for example, to remove variance and improve the accuracy of the identification.

FIG. 14C illustrates an example rule set for determining a classification of lung cancer, where A, B, C and D may indicate certain tissue conditions, classes or sub-types, in accordance with an aspect of the present invention. In operation, when a practitioner or other user desires to know whether a sample contains one of the tissue or cellular classes listed, the method described above may be applied. That is, the iterative process may be repeated, as illustrated, until the desired result is reached. For example, the practitioner may choose to test a sample generally for cancerous cells or for a particular type of cancer. The conditions that are tested may be based on clinical data (e.g., what condition is most likely present) or by "blindly" testing against various conditions. The method disclosed herein increases the accuracy of the diagnosis, and in particular, increases the accuracy even when there is little or no information regarding which conditions are likely present. Moreover, the method disclosed herein may be used for prognosis and/or predictive classifications of a disease or condition.

The method may further include generating prediction images 316. The system may apply the one or more classification models and/or one or more classifier algorithms trained using the classification models to a true image, and generate a prediction image. In addition, the system may apply the one or more classification models and/or classifier algorithms to a biological sample. Example prediction images are illustrated in FIGS. 6B and 12. For example, FIG. 6B illustrates an example where Squamous (SqCC) cancer is predicted in the magenta regions of the biological sample, and where ADC cancer is predicted in the blue regions. As such, the biological sample illustrated in FIG. 6B may be predicted to include both ADC and SqCC.

FIG. 12 illustrates another example prediction image. For example, FIG. 12 illustrates an image of an entire sample, with five classes of tissue predicted in the image. For example, the image illustrates SqCC in the blue regions, ADC in the magenta regions, Necrosis in the green regions, SCLC in the yellow regions, and Normal tissue in the red regions.

The method may include generating confidence prediction images 326. Confidence prediction images may include a confidence value illustrating a level of confidence that a particular class or sub-class of cancer may be present in the prediction image. For example, a higher confidence value may indicate that one or more diseases are present in the prediction image. A higher confidence value may also indicate that a particular disease is more developed. For example, the system may analyze the spectra from the prediction image and when the spectra signal is close to a center of a class of cancer, the confidence level may be high. In addition, a signal where the spectra from the prediction image is pure (e.g., the signal is not mixed with other spectra), the confidence level may be high.

In an aspect, a lower confidence value may indicate, for example, that one or more diseases may be present in the prediction image. For example, the system may analyze the spectra signal and may determine how close the signal may be to a center of a class of cancer. For example, signals that may be within a class of cancer, but farther away from a center of the class (e.g., may be on a boundary or fringe of the spectra for a class), may overlap with another class of cancer. As such, a confidence level that a particular class of cancer may be present in a biological sample may be low. In addition, signals that are farther away from a center of the class may indicate that the sample contains a new class of cancer, a different type of cancer, or a different sub-type of cancer. A lower confidence value may also indicate that the disease has not developed and/or may be a different type of disease.

In an aspect, the confidence value may be a number, for example, in a range from 1 to 10, where 1 is a low to no confidence and 10 is a high confidence. In another example, the confidence value may be a number between 0 and 1, where 0 is no confidence and 1 is high confidence. In an aspect, the system may use one or more prediction calculations to calculate the confidence value. Prediction calculations may include, but are not limited to, Platt Separation Plane, Random Forest, Baysian A-Priori Estimates, Artificial Neural Networks and LDA. It should be noted that a variety of prediction calculations may be used to calculate the confidence value.

In an aspect, the system may overlay a confidence value for each class or sub-class illustrated in the prediction image, and may generate a confidence prediction image illustrating the confidence value. For example, the confidence value may be represented in a binary manner, e.g., a white dot may be added to the image to represent a low confidence value, and no additional information may be added to the image with a high confidence value.

Figure 7A:
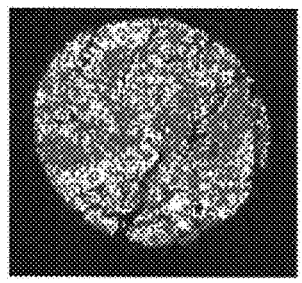
FIGS. 7A and 7B are color Photostats of example confidence prediction images in accordance with an aspect of the present invention.
Figure 7B:
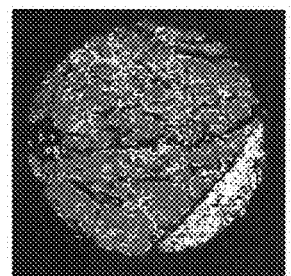

Another example may include a color scale to illustrate the confidence level. A lighter shade of a color or white may represent a low confidence value, while a solid color may represent a high confidence value. Example confidence prediction images are illustrated in FIGS. 7A-7C and 10. As illustrated in FIGS. 7A, 7B and 10, white dots in the image may represent a low confidence that a particular class or sub-class of cancer may be present in the biological sample. For example, the spectra may indicate an abnormality for that region of the biological sample, but the system may have a low confidence in identifying the abnormality. FIG. 7B illustrates an area where high concentrations of white pixels are grouped within a region of the biological sample.

The region of white pixels may represent an area where a new class or sub-class of cancer may be present in the biological sample. The regions in FIGS. 7A, 7B, 7D and 10 where a color is present may represent a high confidence that a particular class or sub-class is present in the biological sample.

Figure 7C:
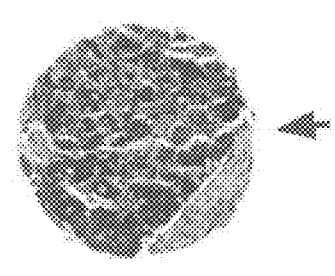
FIG. 7C is a color Photostat of an example prediction overlay on a clinical image in accordance with an aspect of the present invention.
Figure 7D:
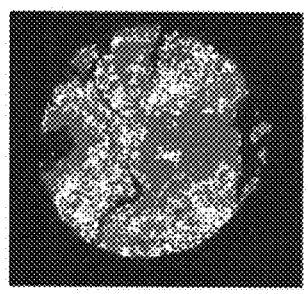
FIG. 7D is a color Photostat of an example confidence prediction image in accordance with an aspect of the present invention.

In addition, FIG. 7C illustrates an example confidence image overlaid on a clinical image. For example, the system may overlay the confidence image on the clinical image, so that an individual may view the confidence image concurrently with the clinical image. For example, the system may transmit the confidence images for presentation on, for example, a field of view of a microscope (e.g., at a pathologist microscope), a display of a computing device, and/or a document or report. In an aspect, the system may project a virtual image of the confidence prediction image into a field of view of a microscope so that an individual may view the confidence prediction image concurrently with the biological sample. The system may overlay the virtual image of the confidence prediction image over the image of biological sample viewable in the microscope so that the individual may be able to receive a biochemical analysis of the biological sample from the confidence prediction image in the foreground of the field of view while viewing the image of the biological sample. The confidence prediction image may highlight areas of the biological sample where the individual may want to analyze further. For example, the individual may be able to zoom in to view different regions of the biological sample based on region of interests identified in the confidence prediction images. In addition, the system may allow an individual to turn on/off the confidence prediction image. By overlaying the confidence prediction over the clinical image, the system may allow an individual to leverage the power of biochemical analysis to identify predictive classifications in the biological sample when viewing the biological sample.

Figure 13:
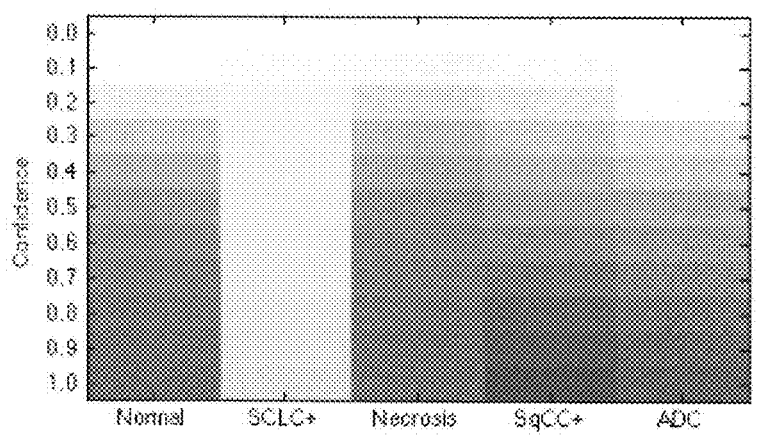
FIG. 13 is a color Photostat of an example legend of the confidence scale associated with a confidence prediction image (e.g., FIGS. 10-13) in accordance with an aspect of the present invention.

Referring now to FIG. 13, illustrated therein is an example prediction legend with a confidence scale to use when viewing confidence prediction images, in accordance with an aspect of the present invention. The prediction legend may illustrate various classes of cancer by color and apply a level of confidence to the color. For example, a low level of confidence may be a light shade of a color or white, while a high level of confidence may a more saturated shade of a color.

The prediction legend may include various classes of cancer that may be illustrated in the confidence prediction image. In an aspect, the prediction legend may include ADC, SqCC, Necrosis, SCLC, and normal tissue, for example. In addition, the prediction legend may assign a color value to each class of cancer represented in the prediction legend. For example, blue may be assigned to SqCC, magenta may be assigned to ADC, green may be assigned to Necrosis, yellow may be assigned to SCLC, and red may be assigned to normal tissue. Any number of classes of cancers and/or different types of diseases may be included in the prediction legend. In addition, the various classes of cancers may be differentiated from each other in a variety of manners, color being one example.

The prediction legend may also include a confidence scale illustrating a confidence level for the prediction. For example, the confidence scale may range from 0 to 1, with 0 representing little to no confidence and 1 representing high confidence. In addition, the prediction legend may alter the color of the class of cancer based on the confidence level. For example, white or a light color may illustrate a low confidence level, and a darker or more saturated color may illustrate a high confidence level. As such, a light blue color may illustrate a low confidence that a biological sample may contain ADC cancer. While a dark green color may indicate a high confidence that a biological sample may contain Necrosis cancer.

Referring to FIG. 3, the method may also include generating a prediction report with confidence values 328. The prediction report may identify the classes and sub-classes of cancer identified in the biological sample and may provide a confidence value illustrating a level of confidence that a particular class or sub-class of cancer may be present in the prediction image. The prediction report may include, for example, true images, prediction images and confidence images, as illustrated in FIGS. 6A-6C, 7A-7D, 10, 11, and 12. For example, FIG. 12 illustrates an example prediction image illustrating five classes of cancer identified in the biological sample. FIG. 10 illustrates an example confidence image illustrating a level of confidence of the five classes of cancer identified in the biological sample.

In addition, the prediction report may include, for example, charts and/or graphs depicting diseases identified in the biological samples, and a level of confidence, as illustrated in FIGS. 15 and 16. For example, FIG. 15 illustrates an example prediction report describing the types of tissue found in the biological sample, a predominant disease class identified, areas of tissue where the disease is identified, and a level of confidence for the analysis. In addition, FIG. 15 illustrates an example bar graph that may illustrate the prediction results. FIG. 16 illustrates an example validation report, in accordance with an aspect of the present invention.

As such, an individual may review a prediction report to easily review the classes of cancer identified in a biological sample and a level of confidence associated with the class of cancer. Moreover, the confidence images and confidence values reports may also be used to visibly illustrate overlapping disease states and/or margins of the disease types for heterogenous diseases, and the level of confidence associated with the overlapping disease states. Thus, a medical profession may be able to use to the prediction report to identify a prominent disease identified in a biological sample, along with any other diseases that may be present in the biological sample, for example.

The method may further include performing a difference analysis between the true image and the prediction image 318. In an aspect, the system may compare the true image of a biological sample with the prediction image of the same biological sample and determine any differences that may be present between the true image and the prediction image. Difference analysis may include, but is not limited to, comparing textures in the true image and prediction image, comparing the true image and the prediction image, comparing spectral variations (e.g., how much the spectra is changing, wide variation), identifying spatial locality differences (e.g., the areas of difference may be clustered together to make a larger region of a same color in an area, the areas of difference may be spread out in another color), IHC markers (e.g., + or −), molecular markers (e.g., + or −), histopathology, and any other suitable meta data or clinical data (e.g., patient information). In an aspect, the system may apply one or more of the above mentioned difference analyses to the prediction image to identify regions of the prediction image that are different from the true image, without an explanation for the difference. By applying more difference analysis to the prediction image, the higher the possibility that the differences identified may be a new class of cancer.

For example, the system may compare the true image illustrated in FIG. 6A with the prediction image illustrated in FIG. 6B and determine whether any differences are illustrated. For example, the true image in FIG. 6A illustrates the biological sample as containing squamous cancer (e.g., the biological sample is the color blue). The prediction image illustrates the biological sample as containing both squamous cancer (the blue color sample) and adenocarcionoma (the magenta color sample). The system may determine that the magenta regions of the prediction image in FIG. 6B are different from the same regions in the true image.

The method may include assigning region of interest pixels to a new class 320. In an aspect, the system may create an annotation region for the region of interest pixels, and assign the annotation region a new class based upon the difference analysis. For example, the system may determine that the magenta regions of the prediction image in FIG. 6B are different from the same regions in the true image in FIG. 6A, and may create annotation regions around the magenta regions of the prediction image to assign a new class. The method may proceed to annotation (308) where a medical professional may provide an annotation to the image, for example, indicating whether the biological sample contains the new class.

The method may include determining a true positive region of interest or true negative region of interest 322. For example, the system may identify pixels of the comparison image that include a true positive region of interest or a true negative region of interest. A true positive region may include, for example, a region of the comparison image where a true image indicates that a class of cancer is present in the true image (e.g., a medical professional annotated the true image with the class of cancer), and where the spectra from the prediction image indicate that a class of cancer is present in the prediction image. A true negative may include, for example, a region of the comparison image where a true image of the biological sample indicates that a class of cancer is not present in the true image (e.g., a medical professional annotated the true image to indicate a class of cancer is not present in the true image), and where the spectra from the prediction image indicates that a class of cancer is not present in the prediction image.

Figure 8B:
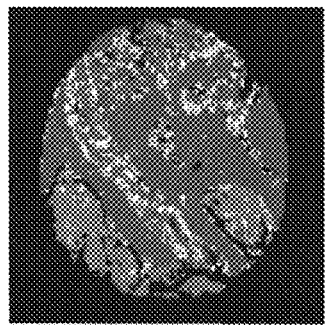
FIG. 8B is a color Photostat of an example of a prediction image in accordance with an aspect of the present invention.

An example of a prediction image with true a positive region is illustrated in FIG. 8B. For example, FIG. 8A illustrates a true image of a biological sample with SqCC+ identified in the blue regions. FIG. 8B illustrates a prediction image for the same biological sample identified in FIG. 8A, with true positive regions where the prediction image also identifies SqCC+ in the same regions identified in the true image. For example, the blue regions in the prediction image may correspond to the blue regions in the true image.

The method may also include determining any false positive region of interest and any false negative region of interest 324. In an aspect, the system may identify pixels of the comparison image that include a false positive region of interest or a false negative region of interest. A false positive region of interest may include, for example, a region in the comparison image where the true image indicates that a class of cancer is not present in the true image and the spectra from the prediction image indicates that the class of cancer is present in the prediction image. A false negative region of interest may include, for example, a region in the comparison image where the true image indicates that a class of cancer is present in the true image and the spectra from the prediction image indicates that the class of cancer is not present in the prediction image.

Figure 8C:
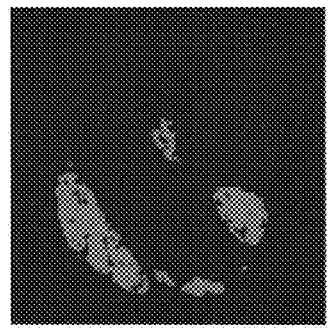
FIG. 8C is a color Photostat of an example image after a true positive/true negative and false positive/false positive analysis has been applied to a prediction image, in accordance with an aspect of the present invention.

An example of a prediction image with a false negative region is illustrated in FIG. 8C. For example, FIG. 8C may illustrate a prediction image for the same biological sample illustrated in FIG. 8A. The false positive regions illustrated in FIG. 8C may include the green regions indicating that Necrosis may be present in the biological samples, where the true image, FIG. 8A, only illustrated SqCC+ in the same regions.

The method may further include selecting a region of interest in the confidence prediction image based on confidence values 330. A region of interest may include regions in the sample that are well differentiated, but where there may be a low confidence level for the type of class or sub-class identified in the biological sample. FIG. 7B illustrates an example of a region of interest that is well differentiated, with a low confidence level. For example, the region of interest shown in FIG. 7B has several multiple white dots spatially located in the region of interest. FIGS. 9A and 9B illustrate example images with poorly differentiated regions of interest selected. In addition, a region of interest may also include regions in the sample that are poorly differentiated, but where there may be a high confidence level in the spectra signal. For example, a region of interest may include a plurality of colored pixels indicating a strong spectra signal for a different class from the true image, located in a poorly differentiated area of the image. In an aspect, the system may receive identified false negative regions of interest and false positive regions of interest and may identify the region of interest by inserting a boundary around the region of interest, such as a circle, a grid, an outline, or other forms of boundaries.

The method may also include assigning region of interest pixels to a new class 332. The system may create an annotation region for the region of interest pixels and assign the annotation region a new class or sub-class. The method may proceed to annotation (308), where a medical professional may provide an annotation to the image indicating that the biological sample may contain the new class, or other methodology (e.g., algorithm) may be applied.

As such, the confidence images may be used adjunctively to aid in providing a diagnosis, prognosis, and/or predictive classification of a biological sample. In addition, the confidence images may be used to drive areas of interest for micro-dissection of a biological sample. For example, regions of interest identified in the confidence image may be used to identify changes in the gene expression of a biological sample.

Figure 4:
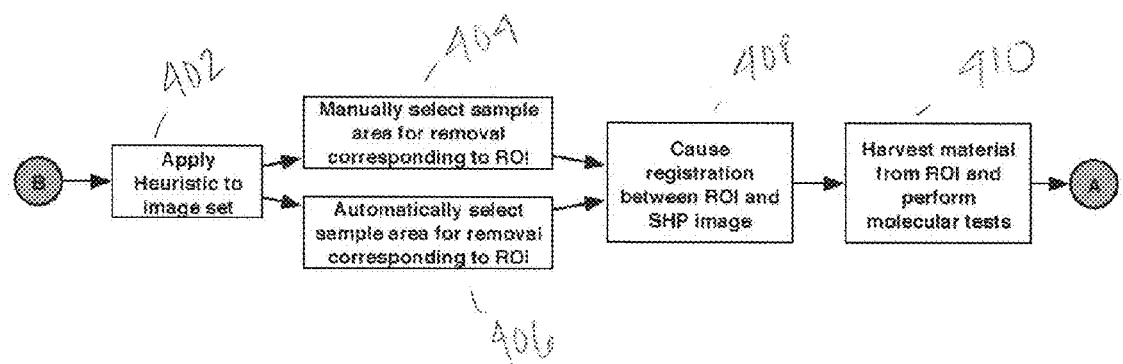
FIG. 4 illustrates an example method flow for using an SHP image to locate and identify regions of a biological sample for micro-dissection in accordance with an aspect of the present invention.

Referring now to FIG. 4, illustrated therein is an example method flow 400 for identifying regions of a biological sample for micro-dissection in accordance with an aspect of the present invention. Micro-dissection may allow for isolated testing and/or micro-detection analysis of regions of a biological sample, for example. In addition, micro-detection analysis may be used, for example, to perform gene expression analysis, gene sequencing, Molecular Analysis (e.g., Next Generation Sequencing (NGS)), and targeted therapies for a patient, for example.

The method may include applying a heuristic to an image set 402. A heuristic may include any logical rule that may identify data in a biological sample for micro-dissection. For example, the heuristic may identify areas of the biological sample with low confidence, areas of the biological sample with multiple attributes, areas classified by a certain tissue type, areas classified with a particular class or sub-class of cancer, and clinical data associated with the biological sample. In an aspect, the system may apply one or more heuristics to an image set to identify data in a biological sample that may be of interest for micro-dissection.

The method may include receiving a selection of a sample area of the biological sample for removal corresponding to a region of interest 404 and 406. A region of interest may be identified using the results of the heuristic(s) applied to the image sets. In an aspect, the system may receive a selection of the sample area for removal from a medical practitioner. The medical practitioner may use an interface on the system to highlight or otherwise identify a sample area. For example, the medical practitioner may draw a boundary around the sample area to identify the sample area for micro-dissection. In another example, the medical practitioner may highlight an area of the sample for micro-dissection.

In another aspect, the system may automatically select the sample area for removal. For example, the system may receive the data from the heuristics and use the data to automatically select sample areas for removal. The system may highlight or otherwise identify the sample area.

Figure 18:
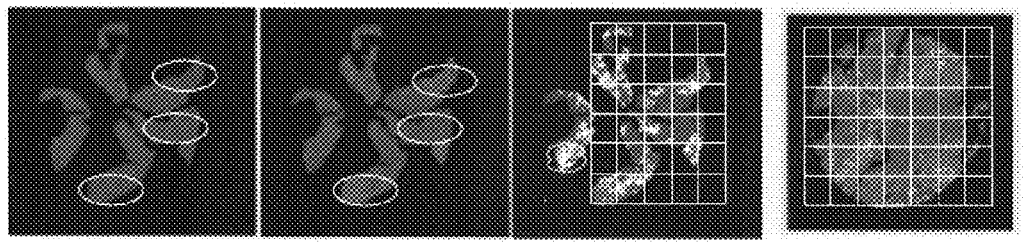
FIGS. 18A-18D are color Photostats of example of the identification and localization of micro-dissection selection regions in accordance with an aspect of the present invention.

FIGS. 18A-18D illustrate example sample areas in accordance with an aspect of the present invention. For example, the sample areas may be highlighted with a circle, as illustrated in FIGS. 18A and 18B. The sample areas may also be highlighted by grids, as illustrated in FIGS. 18C and 18D. In an aspect, the sample areas may be selected based upon confidence levels, as illustrated in FIG. 18C. For example, the regions illustrating a low confidence, e.g., a plurality of white dots, may be selected as a sample area, as illustrated in FIG. 18C.

The method may also include performing a registration between the region of interest and the SHP image 408. A registration between the region of interest and the SHP image may include, for example, associating the spatial location of the region interest with a test identification of the sample area. In an aspect, the system may associate the spatial location from the SHP image with the region of interest, and store the association in a data repository. By performing a registration between the region of interest and the SHP image, the system may be able to associate the gene sequencing analysis performed on the region of interest with the spectral data from the SHP image. In addition, the system may be able to identify any patterns or changes in patterns in the gene sequencing, based on the analysis performed. Moreover, the system may be able to track the tests performed on the sections of the sample.

Figure 17:
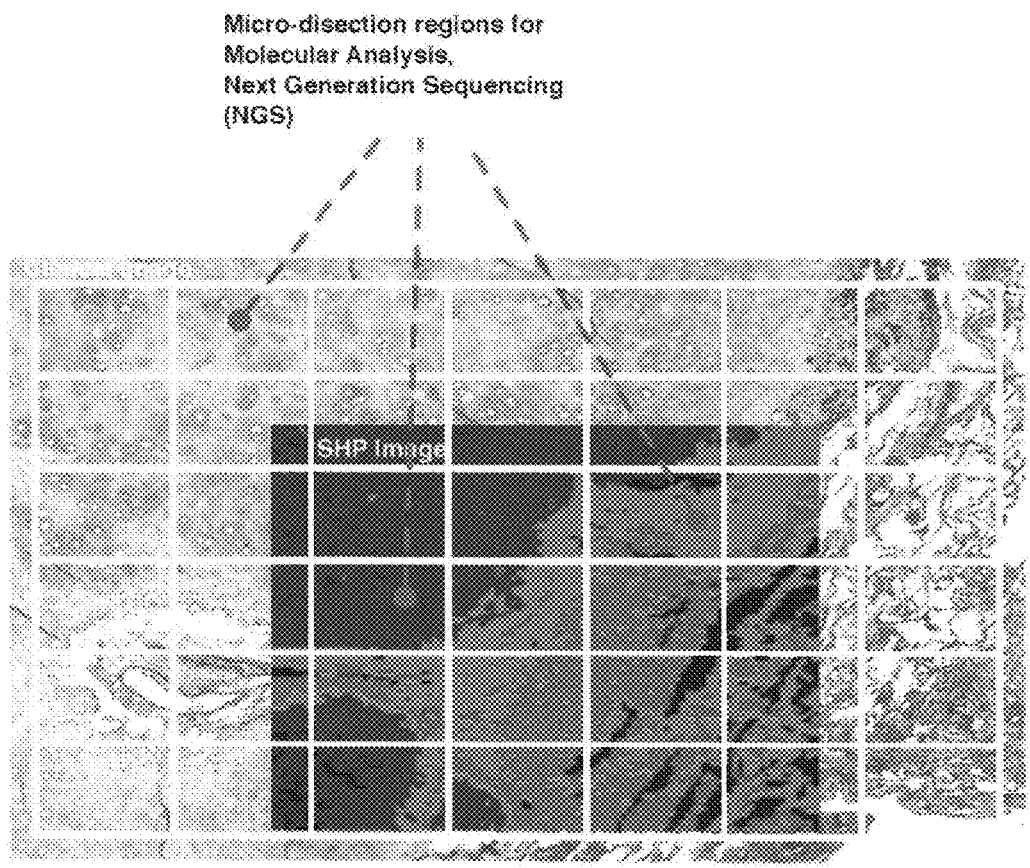
FIG. 17 is a color Photostat of example micro-dissection selection regions in accordance with an aspect of the present invention.

FIG. 17 illustrates an example registration between the clinical image and the SHP image, in accordance with an aspect of the present invention. For example, the system may overlay the SHP image with the clinical image to correlate the spectra from the SHP image with the clinical image.

The method may include harvesting material from the selected sample area and performing molecular tests 410. In an aspect, the system may use the selected sample area to direct an automated tool to remove the sample area from the biological sample. For example, the automated tool may direct a laser or other milling apparatus to remove the sample area from the biological sample. Once the sample area has been removed from the biological sample, the system may perform one or more molecular tests on the sample area.

It is within the scope hereof that the aspects of the present invention may be applied to any particular cell or tissue class, whether cancerous or non-cancerous. When the iterative process is applied, the most accurate results may be achieved when the first iteration analyzes the original specimen data set for the broadest cell or tissue class and, with each subsequent iteration, analyzes the resulting specimen data subset for a narrower cell or tissue class. It is also within the scope hereof that the result of any given iteration may be provided or outputted to indicate which portion of the data is associated with a particular condition. For example, if the first iteration is cancer analysis, the method may proceed to a second iteration of the cancerous data, but may also provide or output information regarding the portion of the data that was found to be non-cancerous.

Figure 19:
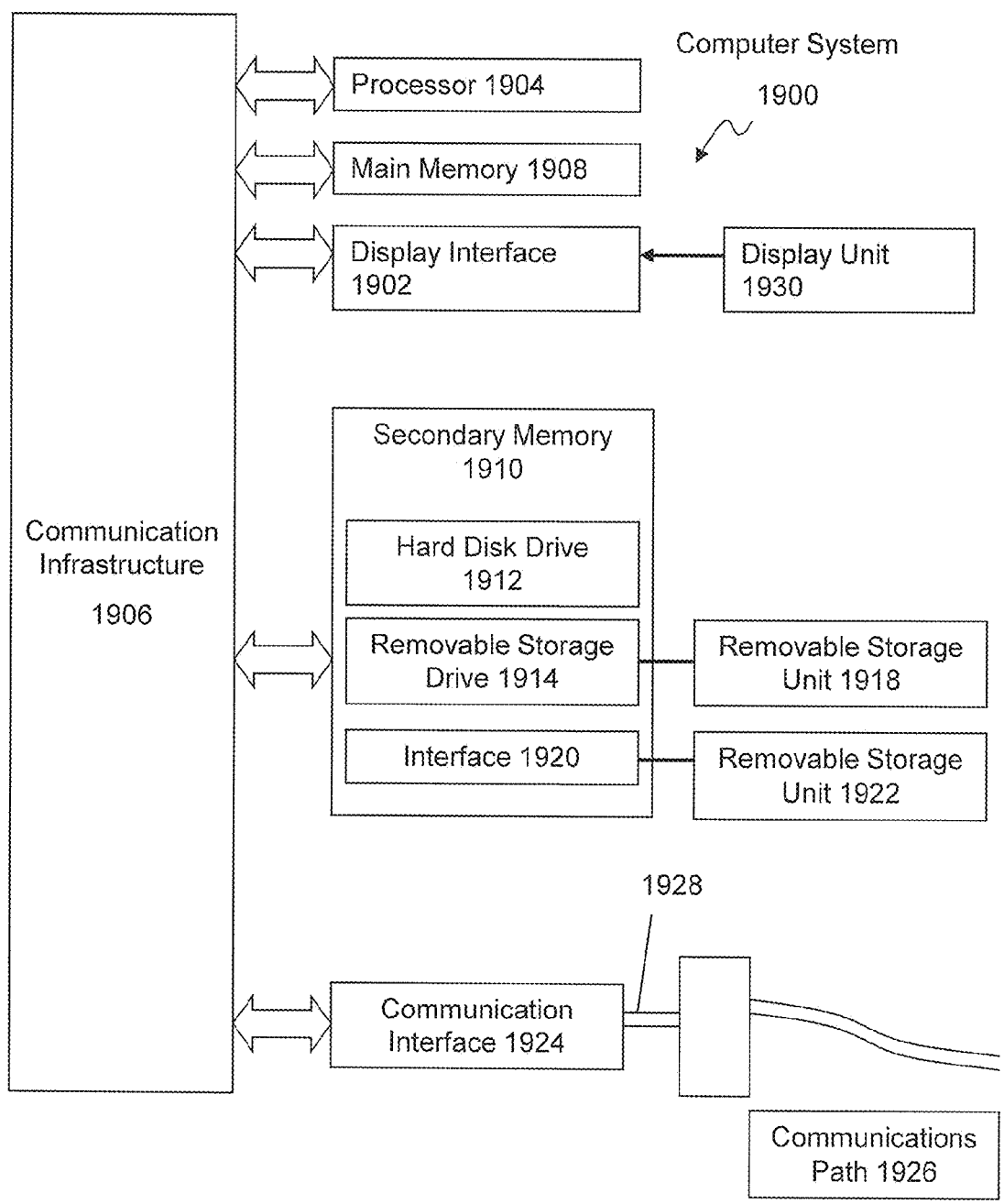
FIG. 19 shows various features of a computer system for use in conjunction with aspects of the invention.

FIG. 19 shows various features of an example computer system 1900 for use in conjunction with methods in accordance with aspects of invention. As shown in FIG. 19, the computer system 1900 is used by a requestor/practitioner or other user 1901 or a representative of the requestor/practitioner or other user 1901 via a terminal 1902, such as a personal computer (PC), minicomputer, mainframe computer, microcomputer, telephone device, personal digital assistant (PDA), or other device having a processor and input capability. The server model comprises, for example, a PC, minicomputer, mainframe computer, microcomputer, or other device having a processor and a repository for data or that is capable of accessing a repository of data. The server model 1906 may be associated, for example, with an accessibly repository of disease-based data such as training sets and/or algorithms for use in diagnosis, prognosis and/or predictive analysis.

Any of the above-described data may be transmitted between the practitioner and SHP system (or other user), for example, via a network, 1910, such as the Internet, for example, and is transmitted between the analyst 1901 and the server model 1906. Communications are made, for example, via couplings 1911, 1913, such as wired, wireless, or fiberoptic links.

Figure 20:
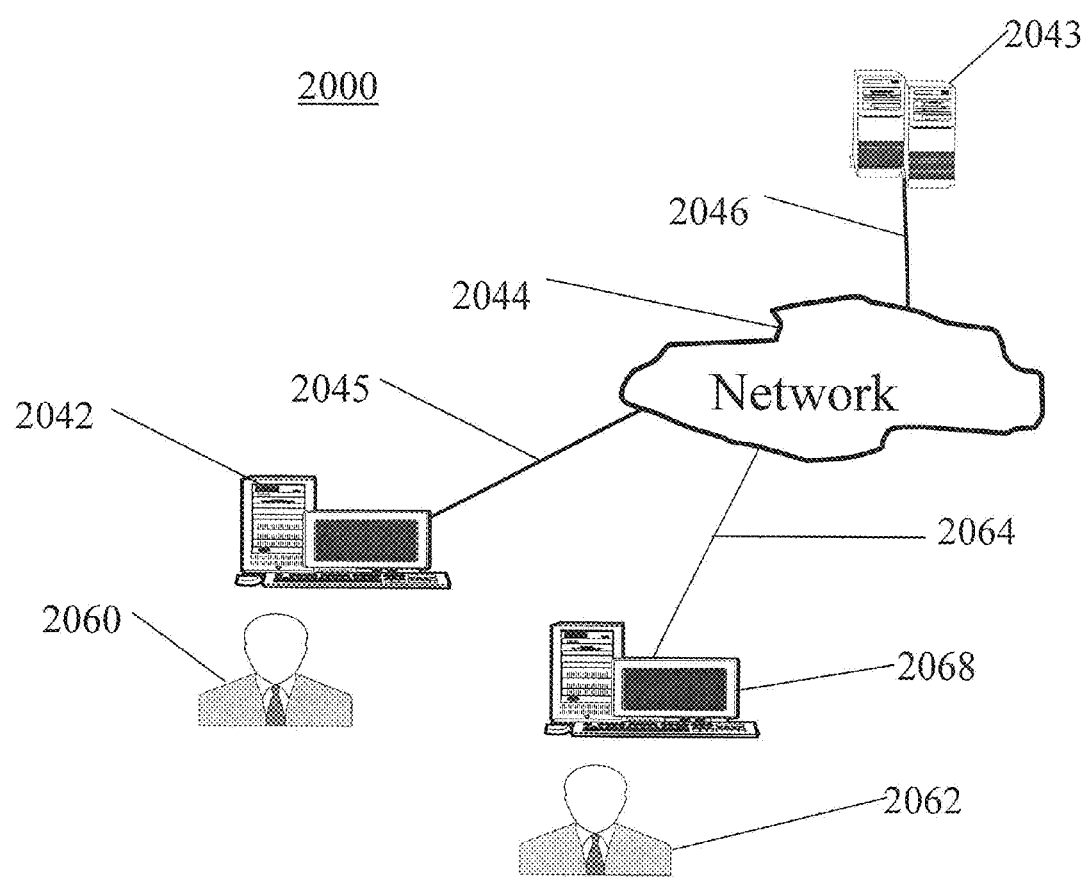
FIG. 20 shows an example computer system for use in conjunction with aspects of the invention.

Aspects of the invention may be implemented using hardware, software or a combination thereof and may be implemented in one or more computer systems or other processing systems. In one variation, aspects of the invention are directed toward one or more computer systems capable of carrying out the functionality described herein. An example of such a computer system 2000 is shown in FIG. 20.

Computer system 2000 includes one or more processors, such as processor 2004. The processor 2004 is connected to a communication infrastructure 2006 (e.g., a communications bus, cross-over bar, or network). Various software aspects are described in terms of this exemplary computer system. After reading this description, it will become apparent to a person skilled in the relevant art(s) how to implement the aspects of invention using other computer systems and/or architectures.

Computer system 2000 can include a display interface 2002 that forwards graphics, text, and other data from the communication infrastructure 2006 (or from a frame buffer not shown) for display on the display unit 2030. Computer system 2000 also includes a main memory 2008, preferably random access memory (RAM), and may also include a secondary memory 2010. The secondary memory 2010 may include, for example, a hard disk drive 2012 and/or a removable storage drive 2014, representing a floppy disk drive, a magnetic tape drive, an optical disk drive, etc. The removable storage drive 2014 reads from and/or writes to a removable storage unit 2018 in a well-known manner. Removable storage unit 2018, represents a floppy disk, magnetic tape, optical disk, etc., which is read by and written to removable storage drive 2014. As will be appreciated, the removable storage unit 2018 includes a computer usable storage medium having stored therein computer software and/or data.

In alternative variations, secondary memory 2010 may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or programmable read only memory (PROM)) and associated socket, and other removable storage units 2022 and interfaces 2020, which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a Personal Computer Memory Card International Association (PCMCIA) slot and card, etc. Software and data transferred via communications interface 2024 are in the form of signals 2028, which may be electronic, electromagnetic, optical or other signals capable of being received by communications interface 2024. These signals 2028 are provided to communications interface 2024 via a communications path (e.g., channel) 2026. This path 2026 carries signals 2028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 2014, a hard disk installed in hard disk drive 2012, and signals 2028. These computer program products provide software to the computer system 2000. Aspects of the invention are directed to such computer program products.

Computer programs (also referred to as computer control logic) are stored in main memory 2008 and/or secondary memory 2010. Computer programs may also be received via communications interface 2024. Such computer programs, when executed, enable the computer system 2000 to perform the features in accordance with aspects of the invention, as discussed herein. In particular, the computer programs, when executed, enable the processor 2004 to perform such features. Accordingly, such computer programs represent controllers of the computer system 2000.

In a variation where aspects of the invention are implemented using software, the software may be stored in a computer program product and loaded into computer system 2000 using removable storage drive 2014, hard drive 2012, or communications interface 2024. The control logic (software), when executed by the processor 2004, causes the processor 2004 to perform the functions as described herein. In another variation, aspects of the invention are implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the invention are implemented using a combination of both hardware and software.

The invention claimed is:

1. A method for classifying a biological sample, the method comprising:
  receiving, at a system, an image of a biological sample;
  generating a true image of the biological sample by applying annotation information to the image and associated spectral data, wherein the annotation information is associated with a specific disease or condition;
  generating a prediction image by applying one or more algorithms to the true image and associated spectral data, wherein the prediction image includes a predictive classification of diseases or conditions identified from the biological sample;
  performing a difference analysis between the true image and the prediction image;
  identifying a region of interest in the prediction image based on the difference analysis, wherein the region of interest is one or more selected from a group consisting of a poorly differentiated region with a high confidence level, a well differentiated region with a low confidence level, and a region with an unexpected confidence level; and
  transmitting the prediction image with the predictive classification to be presented on a display.

2. The method of claim 1, wherein the predictive classification classifies the biological sample into classes, and
  wherein the classes are used for one or more of diagnostic decisions, prognostic decisions, therapeutic decisions, predictive decisions, and companion diagnostic.

3. The method of claim 2, wherein the classes include one or more sub-classifications.

4. The method of claim 2, wherein the classes distinguish heterogeneity of the biological sample.

5. The method of claim 1, further comprising:
  calculating a confidence level for the predictive classification of the diseases or conditions identified from the biological sample;
  generating a confidence prediction image by applying the confidence level to the prediction image; and
  transmitting the confidence prediction image to be presented on a display.

6. The method of claim 1, further comprising:
  determining a differentiation value of the true image, wherein the differentiation value provides a quantitative measure for the grade or level of development of the disease or condition.

7. The method of claim 6, wherein when the differentiation value is low, the particular disease is not developed; and
  wherein when the differentiation value is high, the particular disease is more developed.

8. The method of claim 1, wherein the region of interest comprises one or more selected from a group consisting of a true positive region of interest, a true negative region of interest, a false positive region of interest, and a false negative region of interest.

9. The method of claim 1, further comprising:
  assigning the region of interest to a new class of cancer.

10. The method of claim 9, further comprising:
  applying annotation information to the region of interest, wherein the annotation information is associated with a specific disease or condition.

11. The method of claim 1, wherein the difference analysis comprises one or more selected from a group consisting of comparing textures in the true image and prediction image, comparing the true image and the prediction image, comparing spectral variations, identifying spatial locality differences, comparing immuno-histochemical (IHC) markers, comparing molecular markers, comparing histopathology, and comparing meta data.

12. The method of claim 5, further comprising:
applying a heuristic to an image set, wherein the image set comprises one or more selected from a group consisting of the true image, the predictive image, and the confidence prediction image;
identifying a sample area region of interest of the biological sample based on the heuristic;
aiding in a harvesting a portion of the biological sample, wherein the portion corresponds to the sample area region of interest; and
performing a molecular test on the portion of the biological sample.

13. The method of claim 12, wherein the heuristic comprises one or more selected from a group consisting of identifying areas of the biological sample with low confidence, identifying areas of the biological sample with multiple attributes, identifying areas of the biological sample classified by a certain tissue type, identifying areas of the biological sample classified with a particular class or subclass of cancer, and processing clinical data associated with the biological sample.

14. The method of claim 12, further comprising:
associating the sample area region of interest with a spatial location from the prediction image.

15. A system for classifying a biological sample, the system comprising:
a memory in communication with a processor, wherein the memory and the processor are cooperatively configured to:
receive an image of a biological sample;
generate a true image of the biological sample by applying annotation information to the image and spectral data, wherein the annotation information is associated with a specific disease or condition;
generate a prediction image by applying one or more algorithms to the true image and spectral data, wherein the prediction image includes a predictive classification of diseases or conditions identified from the biological sample;
perform a difference analysis between the true image and the prediction image;
identify a region of interest in the prediction image based on the difference analysis, wherein the region of interest is one or more of a poorly differentiated region with a high confidence level, a well differentiated region with a low confidence level, and a region with an unexpected confidence level; and
transmit the prediction image with the predictive classification to be presented on a display.

16. The system of claim 15, wherein the predictive classification classifies the biological sample into classes, and
wherein the classes are used for one or more of diagnostic decisions, prognostic decisions, therapeutic decisions, predictive decisions, and companion diagnostic.

17. The system of claim 16, wherein the classes include one or more sub-classifications.

18. The system of claim 16, wherein the classes distinguish heterogeneity of the biological sample.

19. The system of claim 15, wherein the processor is further configured to:
calculate a confidence level for the predictive classification of the diseases or conditions identified from the biological sample;
generate a confidence prediction image by applying the confidence level to the prediction image; and
transmit the confidence prediction image to be presented on a display.

20. The system of claim 15, wherein the processor is further configured determine a differentiation value of the true image, wherein the differentiation value provides a quantitative measure for the grade or level of development of the disease or condition.

21. The system of claim 20, wherein, when the differentiation value is low, the particular disease is not developed; and
wherein, when the differentiation value is high, the particular disease is more developed.

22. The system of claim 15, wherein the region of interest comprises one or more selected from a group consisting of a true positive region of interest, a true negative region of interest, a false positive region of interest, and a false negative region of interest.

23. The system of claim 15, wherein the processor is further configured to assign the region of interest to a new class of cancer.

24. The system of claim 23, wherein the processor is further configured to apply annotation information to the region of interest, wherein the annotation information is associated with a specific disease or condition.

25. The system of claim 15, wherein the difference analysis comprises one or more selected from a group consisting of comparing textures in the true image and prediction image, comparing the true image and the prediction image, comparing spectral variations, identifying spatial locality differences, comparing IHC markers, comparing molecular markers, comparing histopathology, and comparing meta data.

26. The system of claim 19, wherein the processor is further configured to:
apply a heuristic to an image set, wherein the image set comprises one or more selected from a group consisting of the true image, the predictive image, and the confidence prediction image;
identify a sample area region of interest of the biological sample based on the heuristic;
aid in a harvesting a portion of the biological sample, wherein the portion corresponds to the sample area region of interest; and
perform a molecular test on the portion of the biological sample.

27. The system of claim 26, wherein the heuristic comprises one or more selected from a group consisting of identifying areas of the biological sample with low confidence, identifying areas of the biological sample with multiple attributes, identifying areas of the biological sample classified by a certain tissue type, identifying areas of the biological sample classified with a particular class or subclass of cancer, and processing clinical data associated with the biological sample.

28. The system of claim 26, wherein the processor is further configured to associate the sample area region of interest to a spatial location from the prediction image.

29. A system for classifying a biological sample, the system comprising:
a receiving module for receiving an image of a biological sample;
a generating module for generating a true image of the biological sample by applying annotation information to the image and spectral data, wherein the annotation information is associated with a specific disease or condition;

wherein the generating module is configured to generate a prediction image by applying one or more algorithms to the true image and spectral data, perform a difference analysis between the true image and the prediction image, and identify a region of interest in the prediction image based on the difference analysis, wherein the prediction image includes a predictive classification of diseases or conditions identified from the biological sample and the region of interest is one or more of a poorly differentiated region with a high confidence level, a well differentiated region with a low confidence level, and a region with an unexpected confidence level; and a transmitting module for transmitting the prediction image with the predictive classification to be presented on a display.

30. The system of claim 29, further comprising:

a heuristic module for applying a heuristic to an image set, wherein the image set comprises one or more selected from a group consisting of the true image, the predictive image, and the confidence prediction image;

an identifying module for identifying a sample area region of interest of the biological sample based on the heuristic;

a harvest module for aiding in a harvesting a portion of the biological sample, wherein the portion corresponds to the sample area region of interest; and a testing module for performing a molecular test on the portion of the biological sample.

31. A computer program product, comprising:

a non-transitory computer-readable medium comprising:

at least one instruction for causing a computer to receive an image of a biological sample;

at least one instruction for causing the computer to generate a true image of the biological sample by applying annotation information to the image and spectral data, wherein the annotation information is associated with a specific disease or condition;

at least one instruction for causing the computer to generate a prediction image by applying one or more algorithms to the true image and spectral data, wherein the prediction image includes a predictive classification of diseases or conditions identified from the biological sample;

at least one instruction for causing the computer to perform a difference analysis between the true image and the prediction image;

at least one instruction for causing the computer to identify a region of interest in the prediction image based on the difference analysis, wherein the region of interest is one or more of a poorly differentiated region with a high confidence level, a well differentiated region with a low confidence level, and a region with an unexpected confidence level; and at least one instruction for causing the computer to transmit the prediction image with the predictive classification to be presented on a display.

* * * * *